US010599485B2

(12) United States Patent
Levandoski et al.

(10) Patent No.: US 10,599,485 B2
(45) Date of Patent: Mar. 24, 2020

(54) INDEX STRUCTURE USING ATOMIC MULTIWORD UPDATE OPERATIONS

(71) Applicant: Microsoft Technology Licensing, LLC, Redmond, WA (US)

(72) Inventors: Justin J Levandoski, Seattle, WA (US); Umar Farooq Minhas, Seattle, WA (US); Per-Ake Larson, Toronto (CA); Tianzheng Wang, Redmond, WA (US); Joy James Prabhu Arulraj, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/003,568

(22) Filed: Jun. 8, 2018

(65) Prior Publication Data

US 2019/0235933 A1 Aug. 1, 2019

Related U.S. Application Data

(60) Provisional application No. 62/624,542, filed on Jan. 31, 2018.

(51) Int. Cl.
*G06F 9/52* (2006.01)
*G06F 9/30* (2018.01)
(Continued)

(52) U.S. Cl.
CPC .......... *G06F 9/52* (2013.01); *G06F 9/30043* (2013.01); *G06F 9/30087* (2013.01);
(Continued)

(58) Field of Classification Search
CPC .... G06F 9/52; G06F 16/2246; G06F 9/30087; G06F 9/30043; G06F 2209/521
See application file for complete search history.

(56) References Cited

U.S. PATENT DOCUMENTS

| 2012/0030408 A1* | 2/2012 | Flynn | G06F 12/0246 711/102 |
| 2013/0166820 A1* | 6/2013 | Batwara | G06F 12/0246 711/103 |

(Continued)

OTHER PUBLICATIONS

Larson, Per-Ake. "Database Systems Meet Non-Volatile Memory." University of Waterloo Data Systems Seminar. https://dsg.uwaterloo.ca/seminars/notes/2016-17/Larson2016.pdf, Sep. 15, 2016. (Year: 2016).*

(Continued)

*Primary Examiner* — Francisco A Grullon
(74) *Attorney, Agent, or Firm* — Schwegman Lundberg & Woessner, P.A.

(57) ABSTRACT

A computer implemented method includes receiving multiple requests to update a data structure stored in non-volatile memory (NVM) and applying an atomic multiword update to the data structure to arbitrate access to the NVM. In a further embodiment, a computer implemented method includes allocating a descriptor for a persistent multi-word compare-and-swap operation (PMwCAS), specifying targeted addresses of words to be modified, returning an error if one of the targeted addresses contains a value not equal to a corresponding compare value, executing the operation atomically if the targeted addresses contain values that match the corresponding compare values, and aborting the operation responsive to the returned error.

17 Claims, 22 Drawing Sheets

*100*

| | | | | | |
|---|---|---|---|---|---|
| 135—PMWCAS STATUS | | UNDECIDED | | | |
| 140—PMWCAS SIZE | | 3 SUB-OPERATIONS | | | |
| 110—TARGET WORD'S ADDRESS | 115 EXPECTED OLD VALUE | 120 NEW VALUE | 125 DIRTY BIT | 130 MEMORY RECYCLING POLICY | |
| 102—ADDRESS-1 | VALUE O | VALUE N | 0 | NONE | |
| 107—ADDRESS-2 | POINTER X | POINTER Y | 1 | FREE ONE | |
| 106—ADDRESS-3 | POINTER Q | POINTER R | 1 | FREE ONE | |

(51) Int. Cl.
G06F 16/22 (2019.01)
G06F 12/02 (2006.01)
G06F 12/0804 (2016.01)
(52) U.S. Cl.
CPC ...... *G06F 12/0238* (2013.01); *G06F 12/0804* (2013.01); *G06F 16/2246* (2019.01); *G06F 2209/521* (2013.01); *G06F 2212/7205* (2013.01)

(56) References Cited

U.S. PATENT DOCUMENTS

2013/0247053 A1\* 9/2013 Therrien .................. G06F 9/52
  718/102
2016/0357791 A1\* 12/2016 Levandoski ........ G06F 12/1009

OTHER PUBLICATIONS

"International Search Report and Written Opinion Issued in PCT Application No. PCT/US19/012800", dated Apr. 23, 2019, 9 Pages.
"Everspin. DDR3 DRAM compatible MRAM: Spin torque technology", Retrieved From: https://www.everspin.com/ddr3-dram-compatible-mram-spin-torque-technology, 2017, 2 Pages.
"Intel Corporation. Intel 64 and IA-32 architectures software developer's manuals", Retrieved From: https://www.intel.com/content/dam/www/public/us/en/documents/manuals/64-ia-32-architectures-software-developer-instruction-set-reference-manual-325383.pdf, Sep. 2016, 2198 Pages.
"Intel Corporation. NVM library", Retrieved From: http://www.pmem.io, 2016, 2 Pages.
"Intel. Intel Architecture Instruction Set Extensions Programming Reference", Retrieved From: https://software.intel.com/sites/default/files/managed/0d/53/319433-022.pdf,, 2017, 145 Pages.
"Microsoft. Profiling Tools", Retrieved From: https://docs.microsoft.com/en-us/visualstudio/profiling/profiling-feature-tour, May 18, 2017, 13 Pages.
"The Open Group Base Specifications Issue 61EEE Std 1003.1, 2004 Edition", http://pubs.opengroup.org/onlinepubs/009695399/functions/strcmp.html, Retrieved on: Jun. 7, 2016, 3 Pages.
Anderson, J H., et al., "Implementing wait-free objects on priority-based systems", In Proceedings of the sixteenth annual ACM symposium on Principles of distributed computing, PODC '97, Aug. 21, 1997, 10 Pages.
Attiya, Hagit, et al., "Built-In Coloring for Highly-Concurrent Doubly-Linked Lists", In Proceedings of International Symposium on Distributed Computing, DISC 2006, LNCS, vol. 4167, 2006, 15 Pages.
Bhandari, Kumud, et al., "Makalu: Fast Recoverable Allocation of Non-volatile Memory", In Proceedings of the 2016 ACM SIGPLAN International Conference on Object-Oriented Programming, Systems, Languages, and Applications, OOPSLA 2016, vol. 51 Issue 10, Oct. 2016, pp. 677-694.
Chatzistergiou, Andreas, et al., "REWIND: Recovery Write-Ahead System for In-Memory Non-Volatile Data-Structures", Retrieved From: http://www.vldb.org/pvldb/vol8/p497-chatzistergiou.pdf, Jan. 2015, 12 Pages.
Chen, S, et al., "Persistent b+-trees in non-volatile main memory", In Proceedings of the VLDB Endowment, vol. Issue 7, Feb. 2015, 12 Pages.
Chen, S, et al., "Rethinking database algorithms for phase change memory", In Proceedings of CIDR'11: 5th Biennial Conference on Innovative Data Systems Research, Jan. 1, 2011, 11 Pages.
Coburn, Joel, et al., "NV-Heaps: Making Persistent Objects Fast and Safe with Next-generation, Non-volatile Memories", In Proceeding of the 16th international conference on Architectural support for programming languages and operating systems, ASPLOS '11, Mar. 1, 2011, 13 Pages.

Cooper, et al., "Benchmarking cloud serving systems with YCSB", In Proceedings of the 1st ACM symposium on Cloud computing, Jun. 10, 2010, pp. 143-154.
Crooke, R, et al., "A revolutionary breakthrough in memory technology", Retrieved From: https://www.micron.com/~/media/documents/ . . . /3d-xpoint-intro-presentation.pdf, 2015, 11 Pages.
Diaconu, et al., "Hekaton: SQL Server's memory-optimized OLTP engine", In Proceedings of the ACM SIGMOD International Conference on Management of Data, Jun. 22, 2013, pp. 1243-1254.
Fraser, K, "Practical lock-freedom", In Thesis Submitted in Partial Fulfilment of Doctor of Philosophy, University of Cambridge, Feb. 2004, 116 Pages.
Greenwald, M, "Two-handed emulation: How to build non-blocking implementations of complex data-structures using DCAS", In Proceedings of the twenty-first annual symposium on Principles of distributed computing, PODC '02, Jul. 21, 2002, pp. 260-269.
Handy, J, "Understanding the Intel/Micron 3D XPoint memory", Retrieved From: https://www.snia.org/sites/default/files/SDC15_presentations/persistant_mem/JimHandy_Understanding_the-Intel.pdf, 2015, 30 Pages.
Harris, "A Practical Multi-Word Compare-and-Swap Operation", In Proceedings of 16th International Conference on Distributed Computing,, Oct. 28, 2002 14 pages.
Harris, Timothy L., "A Pragmatic Implementation of Non-blocking Linked-Lists", In Proceedings of the 15th International Symposium on Distributed Computing, Oct. 1, 2001, 15 Pages.
Hellerstein, et al., "Architecture of a Database System", Foundations and Trends in Databases, vol. 1, Issue 2, 2007, pp. 141-259.
Herlihy, M, "A methodology for implementing highly concurrent data objects", In Journal of ACM Transactions on Programming Languages and Systems (TOPLAS), vol. 15 Issue 5, Nov. 1993, pp. 745-770.
Hoai, Phuong HA., et al., "Reactive Multi-word Synchronization for Multiprocessors", In Proceedings of 2003 12th International Conference on Parallel Architectures and Compilation Techniques, Sep. 27, 2003, 25 Pages.
Hosomi, M, "A novel nonvolatile memory with spin torque transfer magnetization switching: spin-ram", In Proceedings of IEEE International Electron Devices Meeting, 2005. IEDM Technical Digest, Dec. 5, 2005, 4 Pages.
Israeli, et al., "Disjoint-Access-Parallel Implementations of Strong Shared Memory Primitives", In Proceedings of the thirteenth annual ACM symposium on Principles of distributed computing, Aug. 14, 1994, 10 pages.
Jacobi, et al., "Transactional Memory Architecture and Implementation for IBM System z", In Proceedings of IEEE/ACM 45th Annual International Symposium on Microarchitecture,, Dec. 1, 2012, 9 pages.
Kimura, H, "FOEDUS: OLTP Engine for a Thousand Cores and NVRAM", In Proceedings of the 2015 ACM SIGMOD International Conference on Management of Data, SIGMOD '15, May 31, 2015, pp. 691-706.
Kung, et al., "Concurrent manipulation of binary search trees", In Journal of ACM Transactions on Database Systems, vol. 5, Issue 3, Sep. 1980, pp. 354-382.
Leis, et al., "The Adaptive Radix Tree: ARTful Indexing for Main-memory Databases", In Proceedings of the IEEE International Conference on Data Engineering, Apr. 8, 2013, 12 Pages.
Leis, V, et al., "The ART of practical synchronization", In Proceedings of the 12th International Workshop on Data Management on New Hardware, Article No. 3, DaMoN '16, Jun. 26, 2016, 8 Pages.
Arulraj, Joy, et al., "BzTree: A High-Performance Latch-free Range Index for Non-Volatile Memory", In Proceedings of the VLDB Endowment, vol. 11, Issue 5, Jan. 2018, 13 Pages.
Levandoski, "High Performance Transactions in Deuteronomy", In Proceedings of Seventh Biennial Conference on Innovative Data Systems Research, Jan. 4, 2015, 12 Pages.
Levandoski, et al., "The Bw-Tree: A B-tree for new hardware platforms", In Proceedings of IEEE 29th International Conference on Data Engineering, Apr. 8, 2013, 12 Pages.
Lomet D.B, "Process Structuring, Synchronization, and Recovery Using Atomic Actions", In Proceedings of an ACM conference on Language design for reliable software, Mar. 1997, 10 pages.

(56) References Cited

OTHER PUBLICATIONS

Makreshanski, D, et al., "To lock, swap, or elide: On the interplay of hardware transactional memory and lock-free indexing", In Proceedings of the VLDB Endowment, vol. 8, Issue 11, Jul. 2015, pp. 1298-1309.

Mao, et al., "Cache craftiness for fast multicore key-value storage", In Proceedings of the 7th ACM European Conference on Computer Systems, Apr. 10, 2012, pp. 183-196.

McCabe, Thomas J.., "A Complexity Measure", In IEEE Transactions on Software Engineering, vol. SE-2, No. 4, Dec. 1976, 13 Pages.

Michael, Maged M., "Hazard Pointers: Safe Memory Reclamation for Lock-Free Objects", In Proceedings of IEEE Transactions on Parallel and Distributed Systems, vol. 15, Issue: 6, May 4, 2004, pp. 491-504.

Netlist, "Netlist storage class memory", Retrieved From: http://www.netlist.com/products/Storage-Class-Memory/HybriDIMM/default.aspx, 2017, 7 Pages.

Oukid, I, et al., "FPTree: A hybrid SCM-DRAM persistent and concurrent B-tree for storage class memory", In Proceedings of the 2016 International Conference on Management of Data, SIGMOD '16, Jun. 26, 2016, pp. 371-386.

Oukid, I, et al., "Instant recovery for main memory databases", In Proceedings of 7th Biennial Conference on Innovative Data Systems Research (CIDR '15), Jan. 4, 2015, 9 Pages.

Prout, A, "The Story Behind MemSQL's Skiplist Indexes", Retrieved From: http://blog.memsql.com/the-story-behind-memsqls-skiplist-indexes/, 2014, 7 Pages.

Pugh, William, "Skip Lists: A Probabilistic Alternative to Balanced Trees", In Magazine Communications of the ACM, vol. 33, Issue 6, Jun. 1990, 8 Pages.

Schwalb, D, et al., "nvm malloc: Memory allocation for NVRAM", In Proceedings of ADMS@VLDB, 2015, 12 Pages.

Shavit, et al., "Software Transactional Memory", In Proceedings of the fourteenth annual ACM symposium on Principles of distributed computing, Aug. 20, 1995, 10 Pages.

Sundell, H, et al., "Lock-Free Deques and Doubly Linked Lists", In Journal of Parallel and Distributed Computing, vol. 68, Issue 7, Jul. 2008, pp. 1008-1020.

Sundell, Hakan, "Wait-Free Multi-Word Compare-and-Swap Using Greedy Helping and Grabbing", In International Journal of Parallel Programming, vol. 39, Issue 6, Dec. 2011, 7 Pages.

Valois, John D., "Lock-free Data Structures", In Dissertation Submitted in Partial Fulfilment of Doctor of Philosophy, Rensselaer Polytechnic Institute, 1996, 1 Page.

Venkataraman, S, et al., "Consistent and durable data structures for non-volatile byte-addressable memory", In Proceedings of the 9th USENIX conference on File and stroage technologies, FAST'11, Feb. 15, 2011, 15 Pages.

Viking, "Viking technology memory and storage", Retrieved From: https://web.archive.org/web/20151112044258/http://www.vikingtechnology.com/uploads/embedded_overview.pdf, 2017, 6 Pages.

Volos, et al., "Mnemosyne: Lightweight Persistent Memory", In Proceedings of the Sixteenth International Conference on Architectural Support for Programming Languages and Operating Systems, Mar. 5, 2011, pp. 91-104.

Wang, T, et al., "Easy lock-free indexing in non-volatile memory", Retrieved From: http://justinlevandoski.org/papers/mwcas.pdf, In Technical Report, Microsoft Research, Aug. 2017, 13 Pages.

Wang, et al., "Scalable Logging through Emerging Non-Volatile Memory", In Proceedings of the VLDB Endowment, vol. 7, No. 10,, Sep. 1, 2014, pp. 865-876.

Yang, J, et al., "NV-Tree: Reducing consistency cost for NVM-based single level systems", In Proceedings of the 13th USENIX Conference on File and Storage Technologies, FAST'15, Feb. 16, 2015, pp. 167-181.

Yoo, R M., et al., "Performance evaluation of Intel transactional synchronization extensions for high-performance computing", In Proceedings of the International Conference on High Performance Computing, Networking, Storage and Analysis, SC '13, Nov. 17, 2013, 11 Pages.

\* cited by examiner

| | | | | | 100 |
|---|---|---|---|---|---|
| 135—PMWCAS STATUS | | UNDECIDED | | | |
| 140—PMWCAS SIZE | | 3 SUB-OPERATIONS | | | |
| 110—TARGET WORD'S ADDRESS | 115 EXPECTED OLD VALUE | 120 NEW VALUE | 125 DIRTY BIT | 130 MEMORY RECYCLING POLICY | |
| 102—ADDRESS-1 | VALUE O | VALUE N | 0 | NONE | |
| 107—ADDRESS-2 | POINTER X | POINTER Y | 1 | FREE ONE | |
| 106—ADDRESS-3 | POINTER Q | POINTER R | 1 | FREE ONE | |

*FIG. 1*

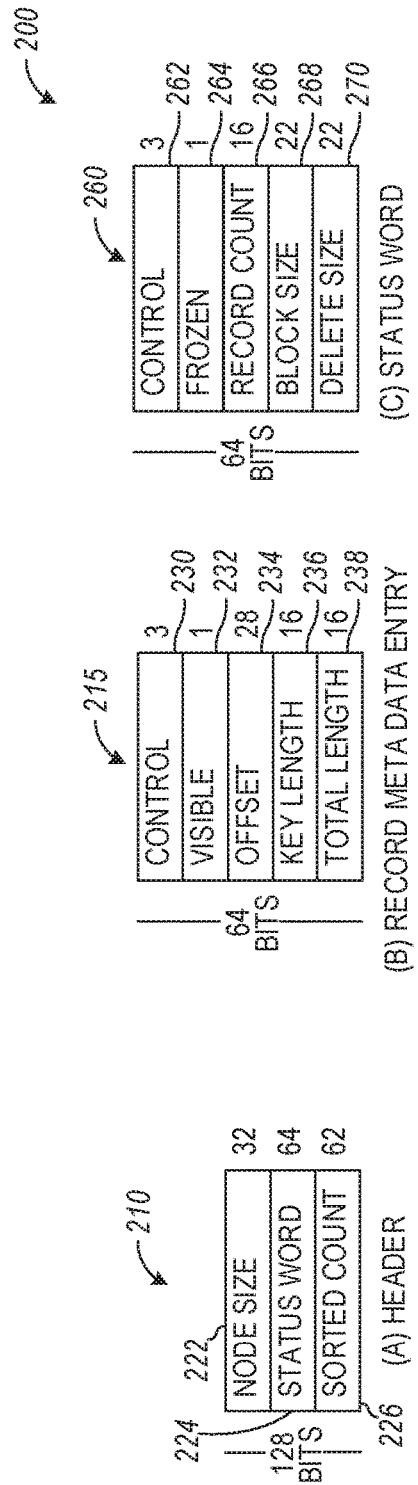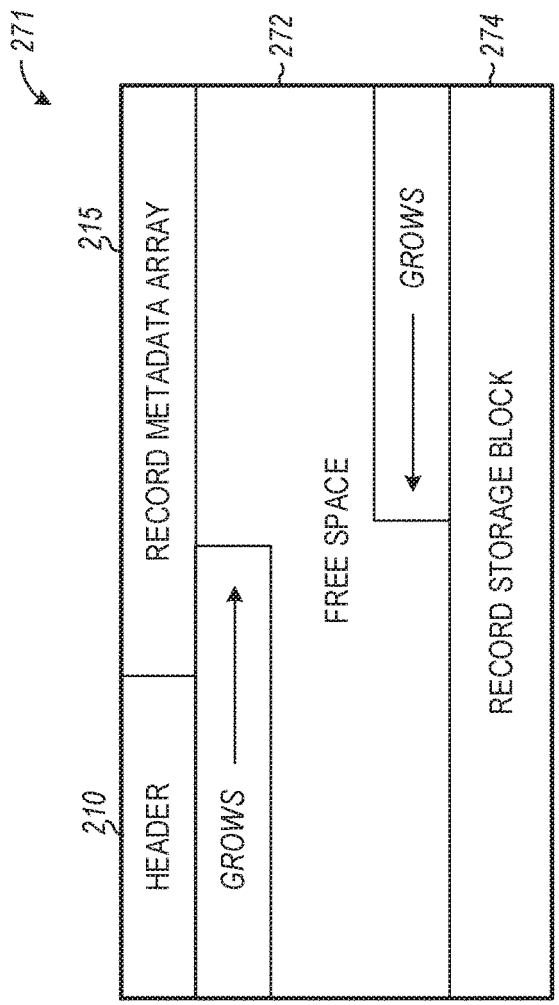
FIG. 2A
FIG. 2B

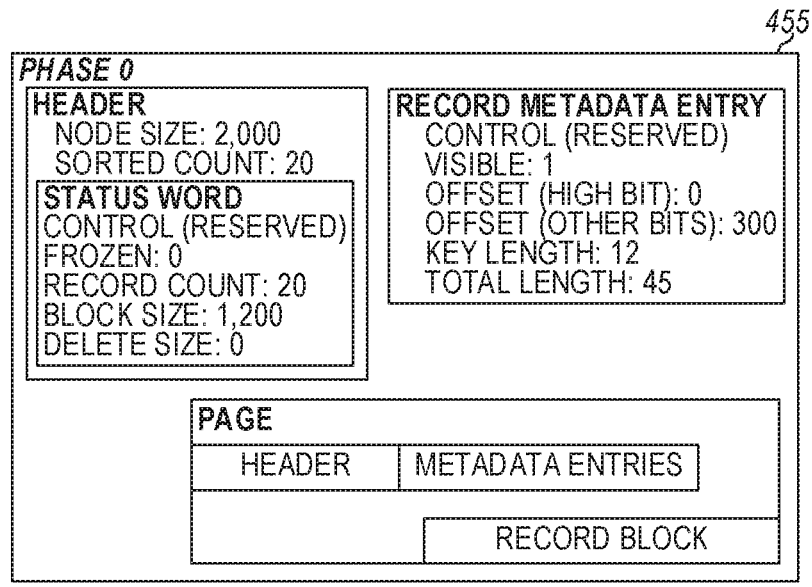
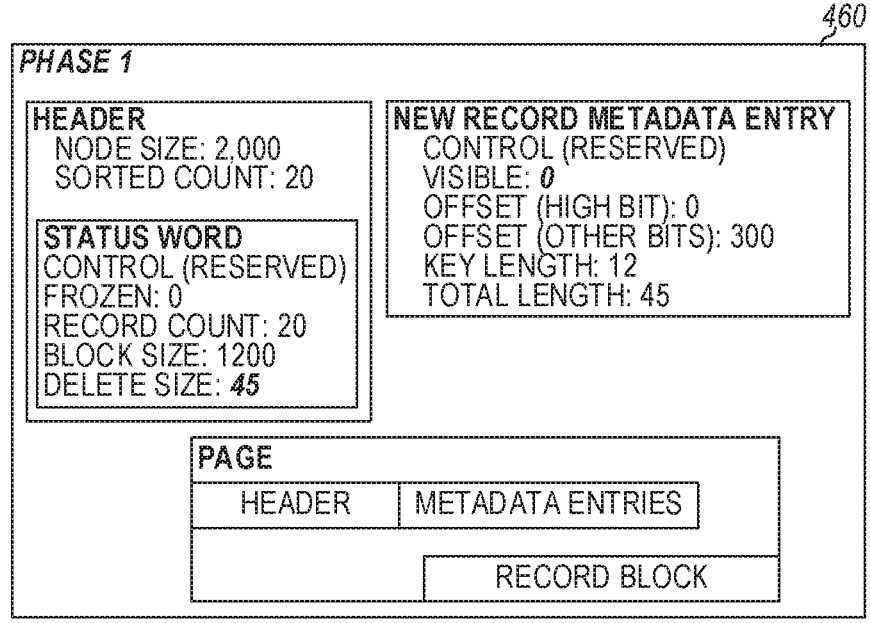
FIG. 4B (A) FREEZE NODE TO SPLIT (B) INSTALL SPLIT

ALGORITHM 1 A PERSISTENT SINGLE-WORD CAS.

```
1   def pcas_read(address):
2       word = *address
3       if word & DirtyFlag is not 0:
4           persist(address, word)
5       return word & ~DirtyFlag
6
7   def persistent_cas(address, old_value, new_value):
8       pcas_read(address)
9       # Conduct the CAS with dirty bit set on new value
10      return CAS(address, old_value, new_value | DirtyFlag)
11
12  def persist(address, value):
13      CLWB(address)
14      CAS(address, value, value & ~DirtyFlag)
```

FIG. 6A

ALGORITHM 2 PMWCAS.

```
1   bool PMwCAS(mdesc):
2     st = Succeeded
3     for w in mdesc.words:
4   retry:
5       rval = install_mwcas_descriptor(w)
6       if rval == w.old_value or rval & AddressMask == mdesc:
7         # Descriptor successfully installed
8         continue
9       elif rval & MwCASFlag is not 0:
10        if rval & DirtyFlag is not 0:
11          persist(w.address, rval)
12        # Clashed another on-going MwCAS, help it finish
13        persistent_mwcas(rval.Address)
14        goto retry
15      else
16        st = Failed
17        break
18
19    # Persist all target fields if Phase 1 succeeded
```

*FIG. 8A*

```
ALGORITHM 2 PMWCAS
20    if st == Succeeded:
21        for w in mdesc.words:
22            persist(w.address, mdesc | MwCASFlag | DirtyFlag)
23
24    # Finalize the MwCAS's status
25    CAS(mdesc.status, Undecided, st | StatusDirtyFlag)
26    if mdesc.status & DirtyFlag:
27        CLWB(&mdesc.status)
28        mdesc.status &= ~DirtyFlag
29
30    # Install the final values
31    for w in mdesc.words:
32        val = mdesc.status == Succeeded ? w.new_value : w.old_value
33        expected = mdesc | MwCASFlag | DirtyFlag
34        rval = CAS(w.address, expected, val | DirtyFlag)
35        if rval == mdesc | MwCASFlag:
36            CAS(w.address, expected & ~DirtyFlag, val)
37        persist(w.address, val)
38    return mdesc.status == Succeeded
```

*FIG. 8B*

```
ALGORITHM 3 READ AND HELP-ALONG ROUTINES FOR PMWCAS
1   def pmwcas_read(address):
2   retry:
3       v = *address
4       if v & RDCSSFlag:
5           complete_install(v & AddressMask)
6           goto retry
7
8       if v & DirtyFlag:
9           persist(address, v)
10          v &= ~DirtyFlag
11
12      if v & MwCASFlag:
13          persistent_mwcas(v & AddressMask)
14          goto retry
15      return v
16
17  def install_mwcas_descriptor(word):
```

*FIG. 9A*

| ALGORITHM 3 READ AND HELP-ALONG ROUTINES FOR PMWCAS |
|---|
| 18   ptr = word \| RDCSSFlag |
| 19  retry: |
| 20   val = CAS(word.address, word.old_value, ptr) |
| 21   if val & RDCSSFlag is not 0: |
| 22     # Hit a descriptor, help it finish |
| 23     complete_install(val & AddressMask) |
| 24     goto retry |
| 25 |
| 26   if val == desc.old_value: |
| 27     # Successfully installed the conditional CAS descriptor |
| 28     complete_install(word) |
| 27   return val |
| 30 |
| 31  def complete_install(wdesc): |
| 32   mwcas_ptr = wdesc.mwcas_descriptor \| MwCASFlag \| DirtyFlag |
| 33   u = wdesc.mwcas_descriptor.status == Undecided |
| 34   CAS(word.address, val, u ? mwcas_ptr : wdesc.old_value) |

*FIG. 9B*

| POLICY | MEANING | EXAMPLE USAGE |
|---|---|---|
| NONE | NO RECYCLING NEEDED. | CHANGE NON-POINTER VALUES. |
| FREE ONE | FREE THE OLD (OR NEW) VALUE MEMORY IF THE PMWCAS SUCCEEDED (OR FAILED). | INSTALL A CONSOLIDATED PAGE IN THE BW-TREE. |
| FREE NEW ON FAILURE | FREE THE NEW VALUE MEMORY IF PMWCAS FAILED; DO NOTHING IF SUCCEEDED. | INSERT A NODE INTO A LINKED LIST. |
| FREE OLD ON SUCCESS | FREE THE OLD VALUE MEMORY IF PMWCAS SUCCEEDED; DO NOTHING IF FAILED. | DELETE A NODE FROM A LINKED LIST. |

FIG. 10

```
1. palloc(p1, size);
2. palloc(p2, size);
+
Complex, error-prone
recovery code
```

```
1. Descriptor *d = AllocateDescriptor();
2. p1 = d->ReserveEntry(a1, o1, FreeOne);
3. palloc(p1, size);
4. p2 = d->ReserveEntry(a2, o2, FreeOne);
5. palloc(p2, size);
```

FIG. 11A

INDEX STRUCTURE USING ATOMIC MULTIWORD UPDATE OPERATIONS

RELATED APPLICATION

This application claims priority to U.S. Provisional Application Ser. No. 62/624,542 (entitled Index Structure Using Atomic Multiword Update Operations, filed Jan. 31, 2018) which is incorporated herein by reference.

BACKGROUND

Storing a database (rows and indexes) entirely in non-volatile memory (NVM) potentially enables both high performance and fast recovery. To fully exploit parallelism on modern CPUs, modern main-memory databases use latch-free (lock-free) index structures, e.g. Bw-tree or skip lists. To achieve high performance NVM-resident indexes also need to be latch-free. Many such designs are complex to implement and require special-purpose recovery code. Further, different versions may be needed for RAM and NVM, which greatly increases the cost of code maintenance.

SUMMARY

A computer implemented method includes receiving multiple requests to update a data structure stored in non-volatile memory (NVM) and applying an atomic multiword update to the data structure to arbitrate access to the NVM.

In a further embodiment, a computer implemented method includes allocating a descriptor for a persistent multi-word compare-and-swap operation (PMwCAS), specifying targeted addresses of words to be modified, returning an error if one of the targeted addresses contains a value not equal to a corresponding compare value, executing the operation atomically if the targeted addresses contain values that match the corresponding compare values, and aborting the operation responsive to the returned error.

BRIEF DESCRIPTION OF THE DRAWINGS

FIG. 1 is a persistent multi-word compare and store (PMwCAS) operation descriptor according to an example embodiment.

FIG. 2A is a data layout diagram of a BzTree node layout according to an example embodiment.

FIG. 2B is a BzTree node diagram according to an example embodiment.

FIG. 4B illustrates phases of a delete operation according to an example embodiment.

FIG. 6A illustrates a first algorithm showing a persistent CAS according to an example embodiment.

FIGS. 8A and 8B illustrate a second algorithm for providing an entry point to a PMwCAS operation according to an example embodiment.

FIGS. 9A and 9B illustrate a third algorithm for providing an entry point for readers of a data structure according to an example embodiment.

FIG. 10 illustrates a table showing example recycle policies according to an example embodiment.

FIG. 11A illustrates allocating two words using a single-word CAS and a persistent multi-word CAS according to an example embodiment.

DETAILED DESCRIPTION

Figure 3:
FIG. 3 is a table summarizing PMwCAS operations associated with all tree operations according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A high-performance lock-free B+ tree design (the BzTree) is optimized for NVM environments. The BzTree takes advantage of the shift to non-volatile memory (NVM) in computer systems to bring improvements to database query and update performance and reduce code architecture in failover scenarios. The BzTree uses a persistent multi-word compare-and-swap operation.

Traditional B+ tree indexes are a fundamental data structure found in all major databases. B+ tree architectures use locking (latching) to ensure correctness for index updates and are optimized to swap data back and forth from memory to magnetic hard disk. Currently, non-volatile memory (NVM) devices are becoming available in the form of NVDIMM, Intel 3D XPoint, and STT-MRAM, which will cause a tectonic shift in the design of durability and recovery techniques for database systems.

The BzTree is a high-performance lock-free B+ tree design that is optimized for NVM environments. The BzTree is latch-free (high-performance) yet simple to implement, reducing implementation complexity by half compared to state-of-the-art designs. The BzTree does not require special-purpose recovery code. Recovery is near-instantaneous when running on NVM. In addition, the same BzTree implementation runs seamlessly on both volatile RAM and NVM.

Storing a database (rows and indexes) entirely in non-volatile memory (NVM) potentially enables both high performance and fast recovery. To fully exploit parallelism on modern CPUs, modern main-memory databases use latch-free (lock-free) index structures, e.g. Bw-tree or skip lists. To achieve high performance NVM-resident indexes also need to be latch-free.

In one embodiment, the BzTree uses a persistent multi-word compare-and-swap operation (PMwCAS) as a building block, enabling an index design that has several important advantages compared with competing index structures such as the Bw-tree. First, the BzTree is latch-free yet simple to implement. Second, the BzTree is fast, showing up to 2× higher throughput than the Bw-tree in experiments. Third, the BzTree does not require any special-purpose recovery code. Recovery is near-instantaneous and involves rolling back (or forward) any PMwCAS operations that were in-flight during failure. End-to-end recovery experiments of BzTree report an average recovery time of 145 μs. Finally, the same BzTree implementation runs seamlessly on both volatile RAM and NVM, which greatly reduces the cost of code maintenance.

Multi-threaded concurrency is one of the keys to unlocking high performance in main-memory databases. To achieve concurrency on modern CPUs, several systems—both research and commercial—implement latch-free index structures to avoid bottlenecks inherent in latching (locking) protocols. For instance, MemSQL uses latch-free skip-lists, while Microsoft's Hekaton main-memory OLTP engine uses the Bw-tree, a latch-free B+Tree.

The algorithms for latch-free index designs are often complex. They rely on atomic CPU hardware primitives such as compare-and-swap (CAS) to atomically modify index state. These atomic instructions are limited to a single word, and non-trivial data structures—such as a latch-free B+Tree—usually require multi-word updates, e.g., to handle operations like node splits and merges. These operations have to be broken up into multiple steps, thereby exposing intermediate states to other threads. As a result, the algorithms must handle subtle race conditions that may occur when intermediate states are exposed. In addition, some designs sacrifice performance to achieve latch-freedom. An example is the Bw-tree that uses a mapping table to map logical page identifiers to physical pointers. Nodes in the Bw-tree store logical pointers and must dereference the mapping table on each node access during traversal of the index. Such indirection leads to degraded performance on modern CPUs.

Storing a main-memory database on byte-addressable non-volatile memory (NVM) further complicates implementation of latch-free indexes. NVM devices are becoming available in the form of NVDIMM, Intel 3D XPoint, and STT-MRAM.

NVM provides close-to-DRAM performance and can be accessed by normal load and store instructions. Storing both records and indexes in NVM enables almost instant recovery, requiring only a small amount of work before the database is online and active.

The added complexity in implementing latch-free indexes in NVM is mainly caused by the fact that CAS and other atomic hardware instructions do not persist their updates to NVM automatically and atomically. An update only modifies the target word in the processor cache and does not automatically update the target word in NVM. In case of a power failure, the volatile cache content is lost and the data in NVM may be left in an inconsistent state. Hence, a persistence protocol should ensure that an index or other data structure recovers correctly after a system crash.

In one embodiment, a BzTree, a high-performance latch-free B+Tree design for main-memory databases may be used. To reduce complexity, various BzTree implementations make use of PMwCAS: a high-performance, multi-word, compare-and-swap operation that also provides persistence guarantees when used on NVM. While one particular persistent multi-word compare and swap operation is described herein, many different CAS operations may be implemented in different manners and used in further embodiments that provide some of the same guarantees as PMwCAS.

The PMwCAS operation is implemented in software with no special hardware support other than a CAS (or equivalent) instruction. It is itself latch-free and either atomically installs all new values or fails the operation without exposing an intermediate state. Using PMwCAS to build a latch-free index has two major advantages. First, the PMwCAS guarantees that all multi-word updates are atomic, thus avoiding the need to handle complex race conditions that result from exposing intermediate state during multi-word operations. Second, PMwCAS allows the BzTree to avoid logical-to-physical indirection used, for example, in the Bw-tree. The BzTree stores direct memory pointers in both index and leaf nodes.

High Performance. Using the YCSB workload on volatile RAM, the BzTree outperforms the Bw-tree. This demonstrates that the BzTree outperforms a state-of-the-art index designed for DRAM-based systems. Given its portability, the penalty for running the BzTree on NVM is low. On realistic workloads, the overhead of persistence is 8% on average. Use of PMwCAS exhibits negligible contention even for larger multi-word operations. Even for highly skewed YCSB access patterns, the failure rate for updating multiple words across multiple BzTree nodes is only 0.2% on average.

The same BzTree implementation can run on both volatile DRAM and on NVM without any code changes, providing seamless portability from volatile DRAM to NVM. PMw- CAS guarantees that upon success of an update (in this case to B+Tree nodes), the operation will be durable on NVM and persist across failures. Remarkably, recovery is handled entirely by the PMwCAS library without any BzTree specific recovery code.

In the following description, the BzTree is described, along with an overview of its architecture. BzTree node layout and single-node updates are then described, as well as alternative structure modifications, and durability and recoverability on NVM.

System Model and NVM: In one embodiment, a system model (shown at 1300 in FIG. 13 described in further detail below) with a single-level store 1303 has NVM 1308 directly attached to the memory bus 1320. Indexes 1330 and base data 1335 reside in NVM. The system 1300 may also contain DRAM 1314 for use as working storage.

NVM devices, such as NVDIMM products behave like DRAM but data stored on these devices is persistent and survives across power failures. Unlike hard disk drives (HDDs) or solid-state drives (SSDs), data in NVM is accessible through normal load and store instructions. NVDIMMs are DRAM whose data content is saved to flash storage on power failure, so their performance characteristics are equivalent to that of DRAM.

When an application issues a store to a location on NVM, the store lands in the volatile CPU caches. To ensure the durability of the store, the store is flushed from the CPU caches using a Cache Line Write Back (CLWB) or Cache Line FLUSH instruction (CLFLUSH) on Intel processors. Both instructions flush the target cache line to memory but CLFLUSH also evicts the cache line.

Lock-free data structure implementations use a mechanism to manage memory lifetime and garbage collection; since there are no locks protecting memory deallocation, the system ensures no thread can dereference a block of memory before it is freed. The BzTree uses a high-performance epoch-based recycling scheme. A thread joins the current epoch before each operation it performs on the index to protect the memory the thread accesses from reclamation. The thread exits the epoch when finished with the operation. When all the threads that joined an epoch E have completed and exited, the garbage collector reclaims the memory occupied by the descriptors deallocated in E. This ensures that no thread can possibly dereference a pointer after its memory is reclaimed.

The BzTree relies on an efficient and persistent multi-word compare-and-swap operation, named PMwCAS, to update state in a lock-free and persistent manner. A descriptor is used to track metadata for the operation (details described later); the descriptors are pooled and eventually reused. The application programming interface (API) for the PMwCAS in one embodiment is:

AllocateDescriptor(callback=default): Allocate a descriptor that will be used throughout the PMwCAS operation. The user can provide a custom callback function for recycling memory pointed to by the words in the PMwCAS operation.

Descriptor::AddWord(address, expected, desired): Specify a word to be modified. The caller provides the address of the word, the expected value and the desired value.

Descriptor::ReserveEntry(addr, expected, policy): Similar to AddWord except the new value is left unspecified; returns a pointer to the new_valuefield so it can be filled in later. Memory referenced by old_value/new_value will be recycled according to the specified policy.

Descriptor::RemoveWord(address): Remove the word previously specified as part of the PMwCAS.

PMwCAS(descriptor): Execute the PMwCAS and return true if succeeded.

Discard(descriptor): Cancel the PMwCAS(only valid before calling PMwCAS). No specified word will be modified.

The API is identical for both volatile and persistent MWCAS. Under the hood, PMwCAS provides all the needed persistence guarantees, without additional actions by the application.

To use PMwCAS, the application first allocates a descriptor and invokes the AddWordor ReserveEntrymethod once for each word to be modified. It can use RemoveWord to remove a previously specified word if needed. AddWord and ReserveEntry ensure that target addresses are unique and return an error if they are not. Calling PMwCAS executes the operation, while Discard aborts it. A failed PMwCAS will leave all target words unchanged. This behavior is guaranteed across a power failure when operating on NVM.

When running on NVM, the PMwCAS provides durability guarantees through the use of instructions to selectively flush or write back a cache line, e.g., via the cache line write-back (CLWB) or cache line flush (CLFLUSH without write-back) instructions on Intel processors. These instructions are carefully placed to ensure linearizable reads and writes and also guarantee correct recovery in case of a crash or power failure. This is achieved by using a single "dirty bit" on all modified words that are observable by other threads during the PMwCAS. For example, each modification that installs a descriptor address (or target value) sets a dirty bit to signify that the value is volatile, and that a reader must flush the value and unset the bit before proceeding. This protocol ensures that any dependent writes are guaranteed that the value read will survive power failure.

Internally, PMwCAS makes use of a descriptor that stores all the information needed to complete the operation. FIG. 1 is a PMwCAS descriptor table 100 whose contents are used by threads to share information about a PMwCAS operation. Example descriptors are shown in rows 102, 104, and 106 in table 100 for three target words in three rows. A descriptor contains, for each target word, (1) the target word's address at column 110, (2) the expected value to compare against at column 115, (3) the new value at column 120, (4) the dirty bit at column 125, and (5) a memory recycling policy at column 130. The policy field indicates whether the new and old values are pointers to memory objects and, if so, which objects are to be freed on the successful completion (or failure) of the operation. The descriptor may also contain a status word 135 tracking the operation's progress and a size 140, indicating the number of sub operations currently in progress. The PMwCAS operation itself is lock-free; the descriptor contains enough information for any thread to help complete (or roll back) the operation. The operation consists of two phases.

Phase 1. This phase attempts to install a pointer to the descriptor (102 for example) in each target address using a double-compare single-swap (RDCSS) operation. RDCSS applies change to a target word only if the values of two words (including the one being changed) match their specified expected values. That is, RDCSS requires an additional "expected" value to compare against (but not modify) compared to a regular CAS. RDCSS is used to guard against subtle race conditions and maintain a linearizable sequence of operations on the same word. Specifically, guard against the installation of a descriptor for a completed PMwCAS (p1) that might inadvertently overwrite the result of another PMwCAS (p2), where p2 should occur after p1.

A descriptor pointer in a word indicates that a PMwCAS is underway. Any thread that encounters a descriptor pointer helps complete the operation before proceeding with its own work, making PMwCAS cooperative (typical for lock-free operations). All information about the operation is stored within the descriptor. The "help-along" thread(s) use the descriptor to perform the operation (possibly concurrently with the original execution thread or other help-along threads that encounter the descriptor) before executing their original PMwCAS operation(s). One high order bit (in addition to the dirty bit) may be used in the target word to signify whether it is a descriptor or regular value. Descriptor pointer installation proceeds in a target address order to avoid deadlocks between two competing PMwCAS operations that might concurrently overlap.

Upon completing Phase 1, a thread persists the target words whose dirty bit is set. To ensure correct recovery, this is done before updating the descriptor's statusfield 135 and advancing to Phase 2. Status 135 is updated using CAS to either Succeeded or Failed (with the dirty bit set) depending on whether Phase 1 succeeded. The statusfield 135 is then persisted and the dirty bit 125 is cleared. Persisting the statusfield "commits" the operation, ensuring its effects survive even across power failures.

Phase 2. If Phase 1 succeeds, the PMwCAS is guaranteed to succeed, even if a failure occurs—recovery will roll forward with the new values recorded in the descriptor. Phase 2 installs the final values (with the dirty bit set) in the target words, replacing the pointers to the descriptor. Since the final values are installed one by one, it is possible that a crash in the middle of Phase 2 leaves some target fields with new values, while others point to the descriptor. Another thread might have observed some of the newly installed values and make dependent actions (e.g., performing a PMwCAS of its own) based on the read. Rolling back in this case might cause data inconsistencies. Therefore, status should be persisted before entering Phase 2. The recovery routine (covered next) can then rely on the statusfield of the descriptor to decide if it should roll forward or backward. If the PMwCAS fails in Phase 1, Phase 2 becomes a rollback procedure by installing the old values (with the dirty bit set) in all target words containing a descriptor pointer.

Recovery. Due to the two-phase execution of PMwCAS, a target address may contain a descriptor pointer or normal value after a crash. For correct recovery, the descriptor is persisted before entering Phase 1. The dirty bit in the statusfield is cleared because the caller has not started to install descriptor pointers in the target fields; any failure that might occur before this point does not affect data consistency upon recovery.

The PMwCAS descriptors are pooled in a memory location known to recovery. Crash recovery then proceeds by scanning the descriptor pool. If a descriptor's status field signifies success, the operation is rolled forward by applying the target values in the descriptor; if the status signifies failure it is rolled back by applying the old values. Uninitialized descriptors are simply ignored. Therefore, recovery time is determined by the number of in-progress PMwCAS operations during the crash; this is usually on the order of number of threads, meaning very fast recovery. In fact, in an end-to-end recovery experiment for the BzTree, we measured an average recovery time of 145 μs when running a write-intensive workload with 48 threads.

Memory Management: Since the PMwCAS is lock-free, descriptor memory lifetime is managed by the epoch-based recycling scheme described above. This ensures that no thread can possibly dereference a descriptor pointer after its memory is reclaimed and reused by another PMwCAS. If any of the 8-byte expected or target values are pointers to larger memory objects, these objects can also be managed by the same memory reclamation scheme. Each word in the descriptor is marked with a memory recycling policy that denotes whether and what memory to free on completion of the operation. For instance, if a PMwCAS succeeds, the user may want memory behind the expected (old) value to be freed once the descriptor is deemed safe to recycle.

BzTree Architecture and Design: The BzTree is a high-performance main-memory B+Tree. Internal nodes store search keys and pointers to child nodes. Leaf nodes store keys and either record pointers or actual payload values. Keys can be variable or fixed length. Experiments by the inventors assume leaf nodes store 8-byte record pointers as payloads (common in main-memory databases), though full variable-length payloads can be handled. The BzTree is a range access method that supports standard atomic key-value operations (insert, read, update, delete, range scan). Typical of most access methods, it can be deployed as a stand-alone key-value store, or embedded in a database engine to support ACID transactions, where concurrency control takes place outside of the access method as is common in most systems (e.g., within a lock manager).

Persistence Modes. A salient feature of the BzTree is that its design works for both volatile and persistent environments. In volatile mode, BzTree nodes are stored in volatile DRAM. Content is lost after a system failure. This mode is appropriate for use in existing main-memory system designs that already contain recovery infrastructure to recover indexes. In durable mode, both internal and leaf nodes are stored in NVM. The BzTree guarantees that all updates are persistent and the index can recover quickly to a correct state after a failure. For disaster recovery (media failure), the BzTree relies on common solutions like database replication.

Metadata. Besides nodes, there are only two other 64-bit values used by the BzTree:

Root Pointer. This is a 64-bit pointer to the root node of the index. When running in persistence mode, this value is persisted in a known location in order to find the index upon restart.

Global Index Epoch. When running in persistence mode, the BzTree is associated with an index epoch number. This value is drawn from a global counter (one per index) that is initially zero for a new index and incremented only when the BzTree restarts after a crash. This value is persisted in a known location, and is used for recovery purposes and to detect in-flight operations (e.g., space allocations within nodes) during a crash.

Complexity and Performance: The BzTree design addresses implementation complexities and performance drawbacks of state-of-the-art lock-free range indexes.

Implementation complexities. State-of-the-art range index designs usually rely on atomic primitives to update state. This is relatively straightforward for single-word updates. For example, the Bw-tree updates a node using a single-word CAS to install a pointer to a delta record within a mapping table. Likewise, designs like the MassTree use a CAS on a status word to arbitrate node updates.

The implementation becomes more complex when handling multi-location updates, such as node splits and merges that grow (or shrink) an index. The Bw-tree breaks multi-node operations into steps that can be installed with a single atomic CAS; a similar approach is taken by the MassTree to avoid locking across nodes. These multi-step operations expose intermediate state to threads that concurrently access the index. This means the implementation must have special logic in place to allow a thread to (a) recognize when it is accessing an incomplete index (e.g., seeing an in-progress split or node delete) and (b) take cooperative action to help complete an in-progress operation. This logic leads to code "bloat" and subtle race conditions that are difficult to debug.

The BzTree uses the PMwCAS primitive to update index state. This approach performs well even when updating multiple nodes atomically. The BzTree thus avoids the subtle race conditions for more complex multi-node operations. In fact, using cyclomatic complexity analysis, it can be seen that the BzTree design is at least half as complex as the Bw-tree and MassTree, two state-of-the-art multicore index designs. Cyclomatic complexity is a quantitative measure of the number of linearly independent paths through source code.

Performance considerations: Some lock-free designs such as the Bw-tree rely on indirection through a mapping table to isolate updates (and node reorganizations) to a single location. Bw-tree nodes store logical node pointers, which are indexes into the mapping table storing the physical node pointers. This approach comes with a tradeoff. While it avoids propagation of pointer changes up the index, e.g. to parent nodes, it requires an extra pointer dereference when accessing each node. This effectively doubles the amount of pointer dereferences during index traversal, leading to reduced performance. The BzTree does not rely on indirection to achieve lock-freedom. Interior index nodes store direct pointers to child nodes to avoid costly extra pointer dereferences during traversal, which can translate into higher performance when compared to the state-of-the-art in latch-free index design.

BzTree node organization and how the BzTree supports lock-free reads and updates on these nodes along with node consolidation is now discussed. Node consolidation is an operation that reorganizes a node to reclaim dead space and speed up search.

FIG. 2A is a data layout diagram of a BzTree node 200 layout. The BzTree node representation follows a typical slotted-page layout, where fixed-size metadata grows "downward" into the node 200, and variable-length storage (key and data) grow "upward." Specifically, a node consists of: (1) a fixed-size header 210, (2) an array of fixed-size record metadata entries 215, (3) free space that buffers updates to the node, and (4) a record storage block that stores variable-length keys and payloads. All fixed-sized metadata is packed into 64-bit aligned words so that it can easily be updated in a lock-free manner using PMwCAS. The word size and other sizes of data fields/entries may vary in further embodiments. The sizes specified are for one example.

The header 210 is located at the beginning of a node 200 and consists of three fields, a node size field (32 bits) 222 that stores the size of the entire node 200, a status word field (64 bits) 224 that stores metadata used for coordinating updates to a node, and a sorted count field (32 bits) 226, representing the last index in the record metadata array in sorted order; any entries beyond this point might be unsorted and represent new records added to the node.

Record metadata array 215 is an entry in the record metadata array that consists of flag bits (4 bits) that are broken into PMwCAS control bits2 (3 bits) 230 used as internal metadata for the PMwCAS (e.g., to mark dirty words that require a flush) along with a visible flag (1 bit) 232 used to mark a record as visible, an offset value (28 bits) 234 points to the full record entry in the key-value storage block, a key length field (16 bits) 236 stores the variable-length key size, and a total length field (16 bits) 238 stores the total length of the record block; subtracting key length from this value provides the record payload size.

Free space is illustrated at 272 in a BzTree node 271 diagram in FIG. 2B. Free space 272 is used to absorb modifications to a node such as record inserts. This free space sits between the fixed-size record metadata array and the record storage block. The record metadata array grows "downward" into this space, while the data storage block grows "upward." However, internal index nodes do not contain free space; as we will discuss later, these nodes are search-optimized and thus do not buffer updates, as doing so results in degraded binary search performance.

A record storage block is illustrated at 274 in FIG. 2B. Entries in the record storage block 274 consist of contiguous key-payload pairs. Keys are variable-length byte strings. Payloads in internal BzTree nodes are fixed-length (8-byte) child node pointers. In one embodiment, payloads stored in leaf nodes are 8-byte record pointers (as is common in main-memory databases). However, the BzTree also supports storing full variable-length payloads within leaf nodes.

Node 200 also includes a status word 260. The status word 260, depicted in FIG. 2A is a 64 bit value that stores node metadata that changes during an update. For leaf nodes, this word contains the following fields: (1) PMwCAS control bits (3 bits) 262 used to atomically update the word, (2) a frozen flag (1 bit) 264 that signals that the node is immutable, (3) a record count field (16 bits) 266 that stores the total number of entries in the record metadata array, (4) a block size field (22 bits) 268 storing the number of bytes occupied by the record storage block at the end of the node, and (5) a delete size field (22 bits) 270 that stores the amount of logically deleted space on the node, which is useful for deciding when to merge or reorganize the node. Status words for internal nodes only contain the first two fields; this is because singleton updates are not performed on internal nodes, rendering the other fields unneeded. The internal nodes may be replaced wholesale (e.g., when adding or deleting a record) for search performance reasons.

Internal nodes and Leaf Nodes have some differences. Besides status word format, internal and leaf nodes differ in that internal nodes are immutable once created, while leaf nodes are not. Internal nodes only store records in sorted order by key (for fast binary search) and do not contain free space. Leaf nodes, on the other hand, contain free space in order to buffer inserts (and updates if the leaf nodes store full record payloads). This means that leaf nodes consist of both sorted records (records present during node creation) and unsorted records (records added to the page incrementally). This approach is used because the vast majority of updates in a B+Tree occur at the leaf level, thus it is important to have leaf nodes quickly absorb record updates "in place". On the other hand, internal index nodes are read-mostly and change less frequently, thus can tolerate wholesale replacement, e.g., when adding a new key as a result of a node split. Keeping internal index nodes search-optimized may lead to better performance than an alternative approach that organizes internal nodes with both sorted and unsorted key space.

Leaf Node Operations. Lock-free read and update operations on BzTree leaf nodes are now described. For writes, the PMwCAS may be used to manipulate the page and record metadata atomically in a lock-free manner, for both reserving space (in the case of copying variable length data into the page) and making the update "visible" to concurrent threads accessing the page. Readers access pages uncontested; they are not blocked by writers. Table 300 in FIG. 3 summarizes the PMwCAS operations associated with all the tree operations, indicating a size at column 310 of PMwCAS tree operations at column 320 associated with different node and structure modification operations. The operations are now described in detail.

Figure 4A:
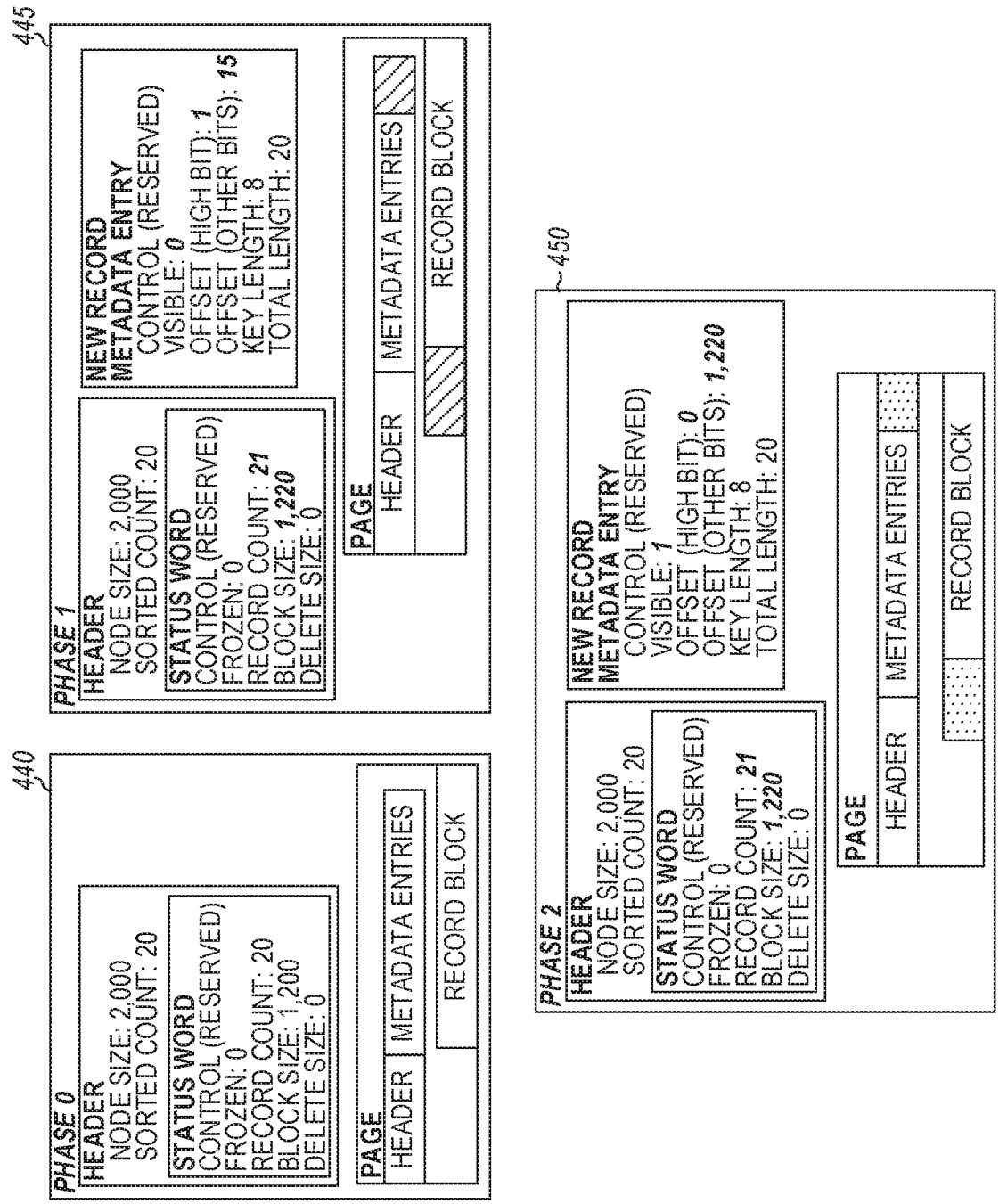
FIG. 4A illustrates phases of an insert operation according to an example embodiment.

An insert operation is shown in FIG. 4A with phase 0 at 440, phase 1 at 445, and phase 2 at 450. Phase 0 has an initial state with 20 records in sorted space and no unsorted records. The example operation inserts a record of length 20 bytes (8 byte key and 12 byte payload). In phase 1, after a first 2-word PMwCAS to change a status word to increase the record count by 1 and increase the record block size by 20, and also to update the new record metadata entry (reserved concurrently by incrementing record count) to initialize to invisible and with an allocation epoch in the offset field (assumed to be 15 in this example. New metadata record is shown with diagonal line pattern. If PMwCAS is successful, variable-length record is copied into record block field (shown with diagonal line pattern.) In phase 2, after second 2-word PMwCAS to finalize the insert, the visible bit is changed in the metadata entry to 1, and changes offset to actual record offset in record block (1,220 in this example.)

Generally, for an insert, new records are added to the free space available in the node. To insert a new record, r, a thread first reads the frozen bit. If it is set, this means the page is immutable and may no longer be part of the index (e.g., due to a concurrent node delete). In this case the thread must re-traverse the index to find the new incarnation of the "live" leaf node. Otherwise, the thread reserves space for r in both the record metadata array and record storage block. This is done by performing a 2-word PMwCAS on the following fields: (1) the node's status word to atomically increment the record countfield by one and add the size of r to the block size value, and (2) the record metadata array entry to flip the offset field's high-order bit and set the rest of its bits equal to the global index epoch. Note that setting this field atomically along with the reservation is safe, since it will only succeed if the space allocation succeeds. If this PMwCAS succeeds, the reservation is a success. The offset field is overridden during this phase to remember the allocation's index epoch. This value is referred to as the allocation epoch and is used for recovery purposes. The high-order bit is stolen to signal whether the value is an allocation epoch (set) or actual record offset (unset).

The insert proceeds by copying the contents of r to the storage block and updating the fields in the corresponding record metadata entry, initializing the visible flag to 0 (invisible). Once the copy completes, the thread flushes r (using CLWB or CLFLUSH) if the index must ensure persistence. The thread then reads the status word value s to again check the frozen bit, aborting and retrying if the page became frozen (e.g., due to a concurrent structure modification). Otherwise, the record is made visible by performing a 2-word PMwCAS on (1) the 64-bit record metadata entry to set the visible bit and also setting the offset field to the actual record block offset (with its high-order bit unset) and (2) the status word, setting it to s (the same value initially read) to detect conflict with a concurrent thread trying to set the frozen bit. If the PMwCAS succeeds, the insert is a success. Otherwise, the thread re-reads the status word (ensuring the frozen bit is unset) and retries the PMwCAS.

Concurrency issues. The BzTree is able to detect concurrent inserts of the same key to enforce, for instance, unique key constraints. An optimistic protocol may be used to detect concurrent key operations as follows. When an insert operation first accesses a node, the insert operation searches the sorted key space for its key and aborts if the key is present. Otherwise, the insert operation continues its search by scanning the unsorted key space. If the insert operation sees any record with an unset visible flag and an allocation epoch value equal to the current global index epoch, this means the insert operation has encountered an in-progress insert that may be for the same key.

An entry with an unset visible flag and an allocation epoch not equal to the global index epoch means it is either deleted or its allocation was in-progress during a crash from a previous incarnation of the index and can be ignored. Instead of waiting for the in-progress insert to become visible, the thread initiating the insert sets an internal recheck flag to remember to re-scan the unsorted key space and continues with its insert. The recheck flag is also set if the thread loses a PMwCAS to reserve space for its insert since the concurrent reservation may be for the same key. Prior to setting its own visibility bit, the thread re-scans the unsorted key space if the recheck flag is set and examines all prior entries before its own position. Upon encountering a duplicate key, the thread zeroes out its entry in the record storage block and sets its offset value to zero; these two actions signify a failed operation that will be ignored by subsequent searches. If the thread encounters an in-progress operation during its scan, it must wait for the record to become visible, since this represents an operation that serialized behind the insert that may contain a duplicate key.

A delete operation is shown in FIG. 4B with phase 0 at 455 and phase 1 at 460. In phase 0, the initial state of the page has 20 records in sorted space and no unsorted records. In the example, a record of length 45 bytes at an offset of 300 in the record block is to be deleted. The existing record metadata entry is shown. In phase 1, after a 2-word PMwCAS to finalize the delete, the PMwCAS atomically changes the visible bit in the metadata entry to make it invisible, while also incrementing the delete size field in the page status word in the header to increment the deleted record size (45 bytes in this example.)

Generally, to delete a record, a thread performs a 2-word PMwCAS on (1) a record's metadata entry to unset its visible bit and set its offset value to zero, signifying a deleted record and (2) the node status word to increment the delete size field by the size of the target record. If the PMwCAS fails due to a concurrent delete or conflict on the status word, the thread retries the delete. If the failure is due to a concurrent operation that set the frozen bit on the node, the delete must re-traverse the index to retry on a mutable leaf node. Incrementing delete size allows the BzTree to determine when to delete or consolidate a node.

Figure 4C:
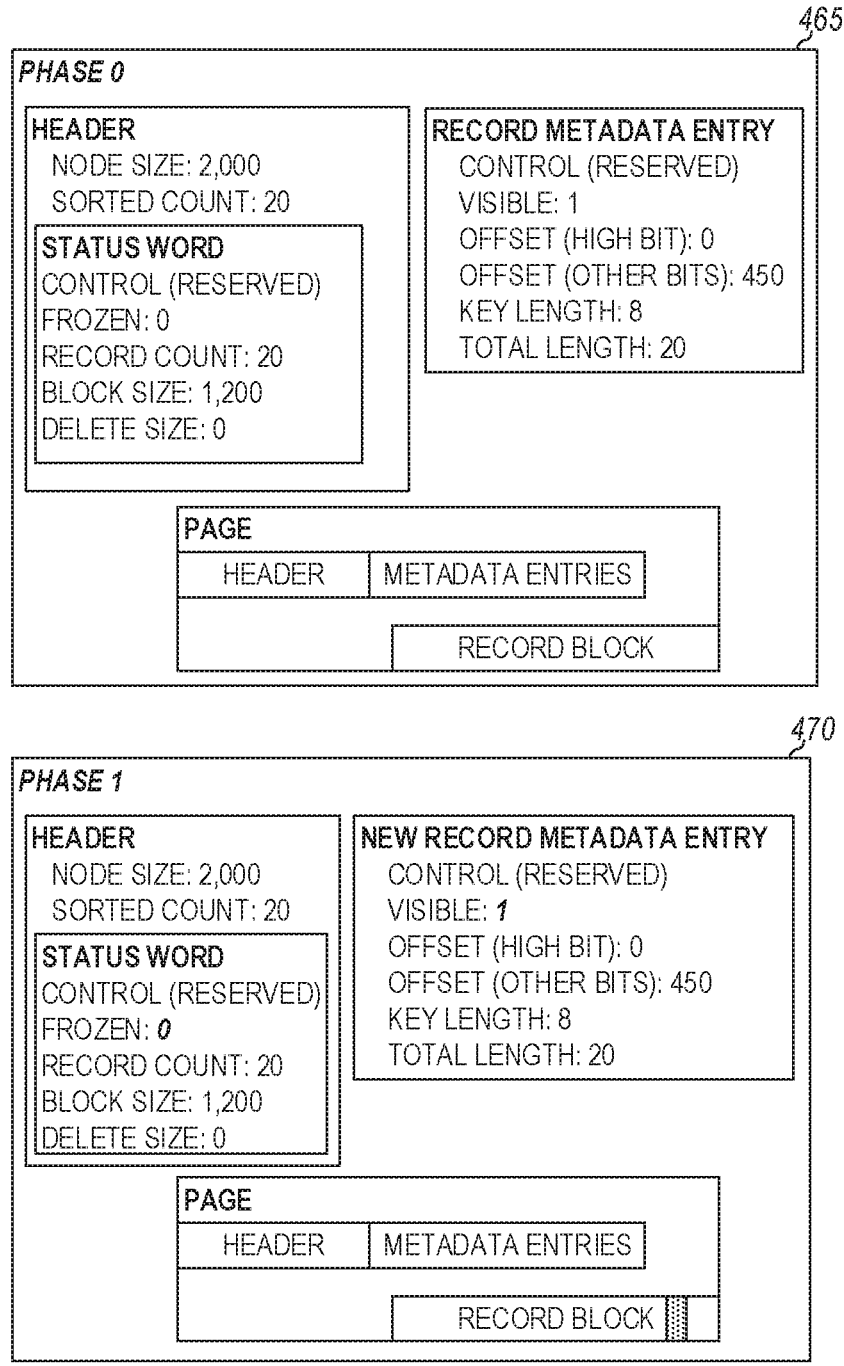
FIG. 4C illustrates phases of an updates of a pointer record according to an example embodiment.

FIG. 4C illustrates an example update of a pointer record, showing phase 0 at 465 and phase 1 at 470. In phase zero, the initial state of the page has 20 records in sorted space with no unsorted records. The example is to update a record pointer stored within the record block to "swap" in the new pointer and remove the existing pointer. In phase 1, after a first 3-word PMwCAS to finalize the update that changes the record pointer within the record storage block (shown as a shaded rectangle, the updated record's metadata entry to set it to the exact same value in order to ensure no concurrent changes take place. The page status word is set to the exact same value to ensure no concurrent freeze of the page.

There are two methods to update an existing record, depending on whether a leaf node stores record pointers or full payloads.

Record pointers. If leaf nodes contain record pointers and the user wishes to update a record in-place, the BzTree is passive and the update thread can simply traverse the pointer to access the record memory directly. If the update requires swapping in a new record pointer, this can be done in place within the record storage block. To do this, a thread reads both (a) the record metadata entry m to ensure it is not deleted and (b) the status word s to ensure the node is not frozen. It then performs a 3-word PMwCAS consisting of (1) the 64-bit pointer in the storage block to install the new pointer, (2) the record's metadata entry, setting it to m (the same value as it read) to detect conflict with a competing delete trying to modify the word, and (3) the status word, setting it to s (the same value it read) to detect conflict with a competing flip of the frozen bit.

Inline payloads. If leaf nodes store full payloads, the update follows the same protocol as an insert by (1) allocating space in the metadata array and record storage block and (2) writing a (key, update_payload) record into the record block that describes the update. The update_payload can be either a full payload replacement or a "byte diff" describing only the part(s) of the payload that have changed. Unlike inserts, concurrent updates are treated to the same key as a natural race, supporting the "last writer wins" protocol. This means there is no need to detect concurrent updates to the same key.

Upsert. The BzTree supports the upsert operation common in most key-value stores. If the record exists in the leaf node, the thread performs an update to that record. If the record does not exist, the thread performs an insert. In this case if the insert fails due to another concurrent insert, the operation can retry to perform an update.

Reads. A salient design point of the BzTree is that update operations do not block readers. A reader simply traverses the index to the target leaf node. If the leaf node stores record pointers, a thread first performs a binary search on the sorted key space. If it does not find its search key (either the key does not exist or was deleted in the sorted space), it performs a sequential scan on the unsorted key space. If the key is found, it returns the record to the user. If leaf nodes store full record payloads, the search first scans the unsorted key space starting from the most recent entry, as recent update records will represent the latest payload for a record. If the key is not found, the search continues to the sorted key space.

A read simply returns the most recent record it finds on the node that matches its search key. It ignores all concurrent update activity on the node by disregarding both the frozen bit and any in-progress record operations (unset visible bits). These concurrent operations are treated as natural races, since (a) any record-level concurrency must be handled outside the BzTree and (b) the frozen bit does not matter to reads, as it is used by operations attempting to reorganize the node to serialize with updates.

Range Scans. The BzTree supports range scans as follows. A user opens a scan iterator by specifying a begin_key and an optional end_key (null if open-ended) defining the range they wish to scan. The scan then proceeds one leaf node at a time until termination. It begins by entering an epoch to ensure memory stability and uses the begin_key to find the initial leaf node. When entering a page, the iterator constructs a response array that lists the valid records (i.e., visible and not deleted) on the node in sorted order. In essence, the response array is a snapshot copy of the node's valid records in its record storage block. After copying the snapshot, the iterator exits its epoch so as to not hold back memory garbage collection. It then services record-at-a-time get_next requests out of its snapshot. Once it exhausts the response array, the iterator proceeds to the next leaf node by entering a new epoch and traversing the tree using a "greater than" search on the largest key in the response array; this value represents the high boundary key of the previous leaf node and will allow the traversal to find the next leaf node position in the scan. This process repeats until the iterator can no longer satisfy the user-provided range boundaries, or the user terminates the iterator.

Leaf Node Consolidation. Eventually a leaf node's search performance and effective space utilization degrade due to side effects of inserts or deletes. Search degrades due to (a) the need to sequentially scan the unsorted key space (in the case of many inserts) and/or (b) a number of deletes adding to the "dead space" within the sorted key space, thereby inflating the cost of binary search. The BzTree will occasionally consolidate (reorganize) a leaf node to increase search performance and eliminate dead space. Consolidation is triggered when free space reaches a minimum threshold, or the amount of logically deleted space on the node is greater than a configurable threshold.

To perform consolidation of a node N, a thread first performs a single-word PMwCAS on the N's status word to set its frozen flag. This prevents any ongoing updates from completing and ensures the consolidation process sees a consistent snapshot of N's records. The process then scans N to locate pointers to all live records on the page—ignoring deleted and invisible records—and calculates the space needed to allocate a fresh node (the size of all valid records plus free space). If this space is beyond a configurable max page size, the process invokes a node split. Otherwise, the process allocates memory for a new node $N'$ along with some free space to buffer new node updates. The process then initializes the header and copies over all live records from N to $N'$ in key-sequential order. Now, $N'$ contains all sorted records and is ready to replace N.

Making $N'$ visible in the index requires "swapping out" a pointer to N at its parent node P to replace it with a pointer to $N'$. To do this, the thread uses its path stack (a stack recording node pointers during traversal) to find a pointer to P. If this pointer represents a frozen page, the thread must re-traverse the index to find the valid parent. The thread then finds the record r in P that stores the child pointer to N and performs an in-place update using a 2-word PMwCAS on the 64-bit child pointer in r to install the pointer to $N'$ and P's status word to detect a concurrent page freeze. If this PMwCAS succeeds, $N'$ is now live in the index and N can be garbage collected. However, N cannot be immediately freed, since this process is lock-free and other threads may still have pointers to N. The BzTree handles this case by using an epoch-based garbage collection approach to safely free memory.

Concurrency during consolidation. Freezing a node prior to consolidation will cause any in-progress updates on that node to fail, as they will detect the set frozen bit when attempting a PMwCAS on the status word. The failed operations will then retry by re-traversing the tree to find a new "live" leaf node. If the operations again land on a frozen node, this is a signal to help along to complete the consolidation instead of "spinning" by continuously re-traversing the index hoping for a live node. In this case, each thread will start its own consolidate process and attempt to install it at the parent. This effectively makes threads race to install a consolidated node, though one will ultimately win. Afterward, each thread resumes its original operation.

Internal Node Operations. Updates to existing records on internal nodes are performed in place following the protocol discussed in the previous section for installing a new child pointer. To maintain search optimality of internal nodes, record inserts and deletes (e.g., part of splitting or deleting a child node) create a completely new version of an internal node. In other words, an insert or delete in an internal node immediately triggers a consolidation. This process is identical to the leaf node consolidation steps just discussed: a new node will be created (except with one record added or removed), and its pointer will be installed at the parent.

Structure Modifications. Latch-free algorithms are now described as used in the BzTree for structure modification operations (SMOs). Like single-node updates, the basic idea for SMOs is to employ the PMwCAS to update page state atomically and in a lock-free manner. This involves manipulating metadata like frozen bits, as well as manipulating search pointers within index nodes to point to new page versions (e.g., split pages).

Node split and node merge algorithms are now described, followed by a discussion of the interplay between the algorithms when commingling structural changes and data changes. Threads concurrently accessing the tree are guaranteed to not observe inconsistencies, which makes both implementation and reasoning about correctness much easier.

Prioritizing Structure Modifications. Triggering SMOs in the BzTree relies on a simple deterministic policy. A split is triggered once a node size passes a configurable max_size threshold (e.g., 4 KB). Likewise, a node delete/merge is triggered once a node's size falls below a configurable min_size. If an update thread encounters a node in need of an SMO, the thread temporarily suspends its operation to perform the SMO before continuing its operation (we do not force readers to perform SMOs). Given that SMOs are relatively heavyweight, prioritizing them over (lightweight) single-record operations is beneficial. Otherwise, in a lock-free race, single-record operations would always win and effectively starve SMOs.

Figure 4D:
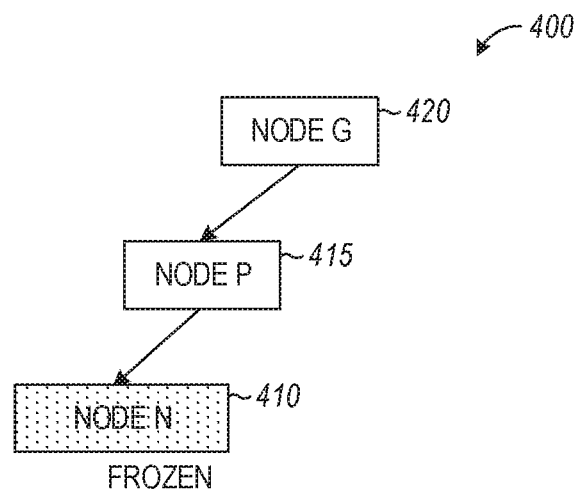
FIG. 4D illustrates a portion of a BzTree according to an example embodiment.
Figure 4E:
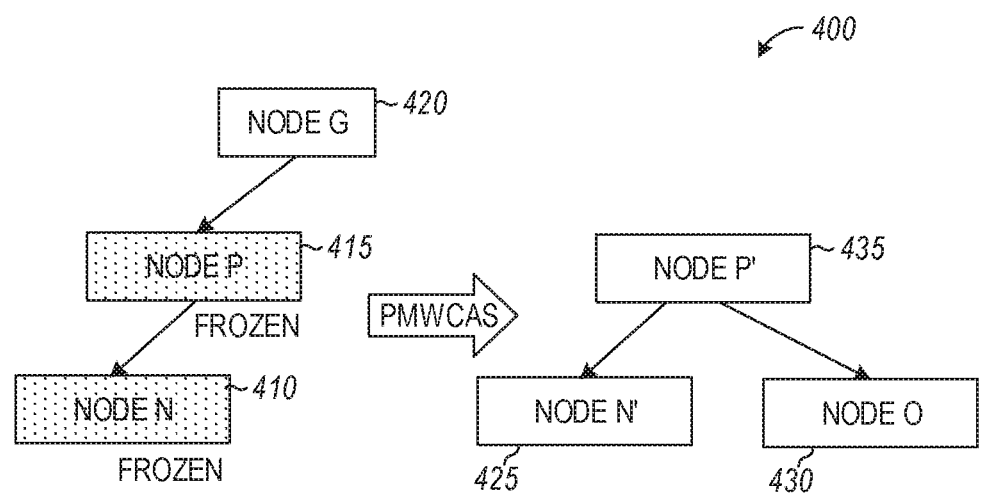
FIG. 4E illustrates a balanced split of the BzTree of FIG. 4D according to an example embodiment.

Node splits are described with reference to FIGS. 4A and 4B. Node splits are broken into two phases (1) a preparation phase that allocates and initializes new nodes with the SMO changes and (2) an installation phase that atomically installs the new nodes in the index. FIGS. 4D and 4E illustrate a balanced split by showing a portion 400 of the BzTree. A node N 410 is to be split. Node N 400 is a child of a parent node P at 415, which also has a parent node G at 420. Node N is to undergo a balanced split, and is first frozen in FIG. 4D.

To split node N, a PMwCAS is performed on its status word to set the frozen bit. Then N is scanned to find all valid records, and a separator key, k, is calculated that provides the balanced split.

Three new nodes are then allocated and initialized. (1) A new version of N (call it $N^I$) 425 that contains all valid records with keys less than or equal to k, (2) a new sibling node O 430 that contains all valid records with keys greater than k, and (3) a new version of N's parent node P (call it $P^I$) 435 that replaces the child pointer of N with a pointer to $N^I$ and adds a new search record consisting of key k and a pointer to the new child O. All nodes are consolidated (search-optimized) and store sorted records.

Installation. Installation of a split involves "swapping out" P to replace it with $P^I$, thereby making the new split nodes $N^I$ and O visible in the index. The installation is atomic and involves using a 3-word PMwCAS to modify the following words (1) the status word of P to set its frozen bit, failure to set the bit means it conflicts with another update to P, (2) the 64-bit child pointer to P at its parent G (N's grandparent) to swap in the new pointer to $P^I$, and (3) G's status word to detect a concurrent page freeze. If the PMwCAS succeeds, the split is complete, and the old nodes P and N are sent to the epoch-protected garbage collector. On failure, a thread retries the split, and the memory for nodes $N^I$, $P^I$, and O can be deallocated immediately since they were never seen by another thread.

Node Merge. The BzTree performs node merges in a latch-free manner similar to node splits. Before triggering a delete of a node N, a sibling is found that will absorb N's existing records. N's left sibling L is found if (1) it shares a common parent (merges that cross parent nodes may be avoided in order to minimize the number of modified nodes) P and (2) is small enough to absorb N's records without subsequently triggering a split (defeating the purpose of a merge). Otherwise, N's right sibling R is considered, verifying it has enough space to absorb N's records without a split. If neither R nor L satisfy the merge constraints, N is allowed to be in an under full state until the constraints are met. In the remainder of this section, it is assumed that N merges with its sibling L.

Preparation. To initiate the delete, a PMwCAS is performed on the status word of both L and N to set their frozen bit. Two new nodes are allocated and initialize: (1) a new version of the left sibling $L^I$ containing its own valid records and all of N's valid records, and (2) a new version of N and L's parent $P^I$ that replaces the child pointer of L with a pointer to $L^I$ and removes the search record containing the separator key between L and N along with the child pointer to N.

Installation. Installation of the node delete and merge involves installing the new version of $P^I$ in the index that makes the merged child node $L^I$ visible and removes N and L. This operation is identical to that of node split that replaces the parent P with $P^I$ by both freezing P as well as updating its parent G to install the new child pointer to $P^I$.

Interplay Between Algorithms. The BzTree offloads the handling of ACID transactions to a higher software layer of the system. This could, for instance, be a logical concurrency control component in a decoupled database system. Inside the tree, it is responsible for correctly serializing conflicting data and structural changes. We now describe how BzTree ensures that threads do not observe the effects of in-progress changes.

Co-operative PMwCAS. B+Tree implementations typically rely on latches for preventing threads from observing changes performed by concurrent threads. The BzTree instead employs PMwCAS to accomplish this employing a latch-free PMwCAS library. The PMwCAS operation is cooperative, in that any thread (reader or writer) that encounters an in-progress PMwCAS.

Preparation. To split a node N, a PMwCAS on is performed on its status word to set the frozen bit. N is then scanned to find all valid records and a separator key k is calculated that will first help along to complete the operation before continuing with its own. This policy effectively serializes PMwCAS operations that might conflict. It also ensures the atomicity of operations within the BzTree. Since all updates to the index are performed using PMwCAS, updates will either succeed uncontested, or the PMwCAS help-along protocol will arbitrate conflict and abort some conflicting operations.

Record operations and structure modifications. BzTree employs the status word to correctly serialize conflicting data and structural changes that might conflict with each other. For instance, an in-progress consolidate or SMO will first set the frozen bit within a node. This causes all in-flight record-level operations to fail their PMwCAS due to conflict on the status word. These record operations will then retry and either see (a) the frozen version of a node that requires maintenance, for which it will attempt to complete or (b) a new (unfrozen) version of the node that is ready for record updates.

Serializing structure modifications. The BzTree uses a cooperative approach for serializing conflicting SMOs. Consider a node deletion operation. To delete node N, the BzTree first checks if its left sibling L is alive. If it observes that L is frozen, then it detects that another structural change is in progress. In this case the BzTree serializes the deletion of N (if still needed) after that of L.

BzTree Durability and Recovery. BzTree ensures recoverability of the tree across system failures using PMwCAS. BzTree stores the tree either on DRAM when used in volatile mode, or on NVM when used in durable mode. In volatile mode, the BzTree does not flush the state of the tree to durable storage. However, when used in durable mode, it persists the tree on NVM to preserve it across system failures. The BzTree does not need to employ a specific recovery algorithm. It instead relies on the recovery algorithms of a persistent memory allocator and the PMwCAS library to avoid persistent memory leaks and ensure recoverability, respectively. We now describe these algorithms in detail.

Persistent Memory Allocation. A classic volatile memory allocator with an allocate and free interface does not ensure correct recovery when used on NVM. If the allocator marks a memory chunk as being in use (due to allocate), and the application (e.g., BzTree) fails to install the allocated chunk on NVM before a crash, then this causes a persistent memory leak. In this state, the memory chunk is "homeless" in that it can neither be seen by the application nor by the memory allocator after a crash.

In some embodiments, a three-stage allocator that provides the following states: (1) allocate, (2) activated, and (3) free may be used. The application first requests the allocation of a memory chunk. The allocator updates the chunk's meta-data to indicate that it has been allocated and returns it to the application. During recovery after a system failure, the allocator reclaims all allocated memory chunks. To retain the ownership of the memory chunk even after a failure, the application must separately request that the allocator activate the memory chunk. At this point in time, the application owns the memory chunk and is responsible for its lifetime, including any cleanup after a failure.

The application should carefully interact with the allocator in the activation process, through an interface (provided by the allocator) that is similar to posix_memalign which accepts a reference of the successfully persisted the address of the newly allocated memory in the provided reference.

Durability. There are two cases by which the BzTree handles durability of index data.

Variable-length data. Newly inserted records as well as new node memory (allocated as part of a consolidate, split, or delete/merge) represents variable-length data in the BzTree. To ensure durability, the BzTree flushes all variable-length data before it can be read by other threads. That is, newly inserted record memory on a node is flushed before the atomic flip of its visible bit. Likewise, new node memory is flushed before it is "linked into" the index using a PMwCAS. This flush-before-visible protocol ensures that variable-length data in the BzTree is durable when it becomes readable to concurrent threads.

Word-size data. The durability of word-size modifications is handled by the PMwCAS operation. PMwCAS ensures durability of all words it modifies upon acknowledging success. Thus, modifications like changing the node status word and reserving and updating a record's metadata entry are guaranteed to be durable when modified using the PMwCAS. In addition, all modifications performed by the PMwCAS are guaranteed to be durable to concurrent readers.

The BzTree avoids inconsistencies arising from write-after-read dependencies. That is, it guarantees that a thread cannot read a volatile modification made by another thread. Otherwise, any action taken after the read (such as a dependent write) might not survive across a crash and lead to an inconsistent index. As mentioned above, the flush-before-visible protocol ensures this property for variable-length modifications to the BzTree. Likewise, the PMwCAS ensures this property for word-sized modifications.

Recovery. Memory lifetime. The PMwCAS library maintains a pool of descriptors at a well-defined location on NVM. Each word descriptor contains a field specifying a memory recycling policy. This policy defines how the memory pointed to by the old value and new value fields should be handled when the PMwCAS operation concludes. The PMwCAS library supports two memory recycling policies: NONE and FREE-ONE. With the former policy, there is no need for recycling memory. BzTree uses this policy for modifying non-pointer values, such as the status word in nodes. With the latter policy, the PMwCAS library frees the memory pointed to by the old (or new) value depending on whether the PMwCAS operation succeeds (or fails). The BzTree uses this policy when allocating and installing a new node in the tree. To activate the node memory, BzTree provides a memory reference to the descriptor word responsible for holding a pointer to the node memory. This ensures an atomic transfer of the activated memory pointer to the descriptor. The memory lifetime is then handled by the PMwCAS library. In case of a failure, the node's memory is reclaimed by the recovery algorithm. This obviates the need for BzTree to implement its own memory recycling mechanism.

Recovery steps. During recovery from a system failure, the allocator first runs its recovery algorithm to reclaim memory chunks that have been reserved but not yet activated. Then, the PMwCAS library executes its recovery algorithm to ensure that the effects of all successfully completed PMwCAS operations are persisted. Upon restart after a crash, any in-flight PMwCAS operations marked as succeeded will roll forward, otherwise they will roll back. For operations involving memory pointer swaps, the PMw-CAS will ensure that allocated and active memory are dereferenced by its descriptors will be correctly handled according to the provided memory recycling policy.

Aborted space allocations. While PMwCAS recovery can handle recovery of 64-bit word modifications, including pointer swaps and node memory allocations, it cannot handle recovery of dangling record space allocations within a node. An insert (and update if leaf nodes contain full record payloads) is broken into two atomic parts: record space allocation and record initialization (copying key bytes and populating metadata) and making the record visible. The BzTree is able to detect and recover failed inserts that allocated space within a node in record space allocation, but crashed during record initialization before a record was fully populated and made visible. The BzTree uses the allocation epoch for this purpose whose value is temporarily stored in the offset field until record initialization completes). Since this field is populated atomically during record space allocation, any subsequent failure before completion of record initialization will be detected after recovery increments the global index epoch.

Doing so will invalidate any searches—such as those done by inserts checking for duplicate keys—that encounter an allocation from a previous epoch. This dangling node space will be reclaimed when the node is rebuilt during consolidation or a structure modification.

Further detail regarding the PMwCAS is now provided. As mentioned, any structure that can update multiple words atomically may be used with the BzTree, but PMwCAS improves upon prior multiword atomic update structures.

Large non-volatile memories (NVRAM) will change the durability and recovery mechanisms of main-memory database systems. Today, these systems make operations durable through logging and checkpointing to secondary storage, and recover by rebuilding the in-memory database (records and indexes) from on-disk state. A main-memory database stored in NVRAM, however, can potentially recover instantly after a power failure. Modern main-memory databases typically use lock-free index structures to enable a high degree of concurrency. Thus NVRAM-resident databases need indexes that are both lock-free and persistent. PMwCAS is lock-free, persistent, and efficient. The PMwCAS operation significantly reduces the complexity of building lock-free indexes as illustrated herein by describing implementations of both doubly-linked skip lists and the Bw-tree lock-free B+-tree for NVRAM. Runtime overhead introduced by PMwCAS is very low (~4-6% under realistic workloads). This overhead is sufficiently low that the same implementation can be used for both DRAM-resident indexes and NVRAM-resident indexes. Not requiring separate implementations for both cases greatly reduces the cost of code maintenance.

Non-trivial lock-free data-structures are already tricky to design and implement in volatile memory systems. These implementations use atomic instructions such as compare-and-swap (CAS) to coordinate interaction among threads. However, these instructions operate on single words, and non-trivial data structures usually require atomic updates of multiple words (e.g., for B+-tree page splits and merges). Implementing lock-free indexes on NVRAM in this manner is even more difficult: the same atomic instructions can still be used, but since the processor cache is volatile, while NVRAM is durable, there must be a persistence protocol in place to ensure the data structure recovers correctly after a crash. It is desired to make sure that a write is persisted on NVRAM before any dependent reads, otherwise the index might recover to an inconsistent state.

Lock-free indexes for NVRAM are made persistent by use of the persistent multi-word compare-and-swap operation (PMwCAS) that provides atomic compare-and-swap semantics across arbitrary words in NVRAM. The operation itself is lock-free and guarantees durability of the modified words. PMwCAS greatly simplifies the implementation of lock-free data structures. Using PMwCAS, the developer specifies the memory words to modify along with the expected and desired values for each (similar to a single-word CAS). The PMwCAS operation will either atomically install all new values or fail the operation without exposing intermediate state (e.g., a partially completed operation) to the user. This behavior is also guaranteed across a power failure.

Persistence across failures is guaranteed without requiring any logging or special recovery logic in the index code. PMwCAS is the first implementation of a multi-word CAS operation for non-volatile memory and used a prior volatile MwCAS operation as a starting point while adding persistence guarantees and support for recovery. Other versions of volatile MwCAS operations are either slower and/or more complex than the version PMwCAS used as a starting point. To show how PMwCAS eases engineering complexity and code maintenance, implementation of two high-performance lock-free indexes is now described, a doubly linked lock free skip list, and a Bw-tree.

Figure 5:
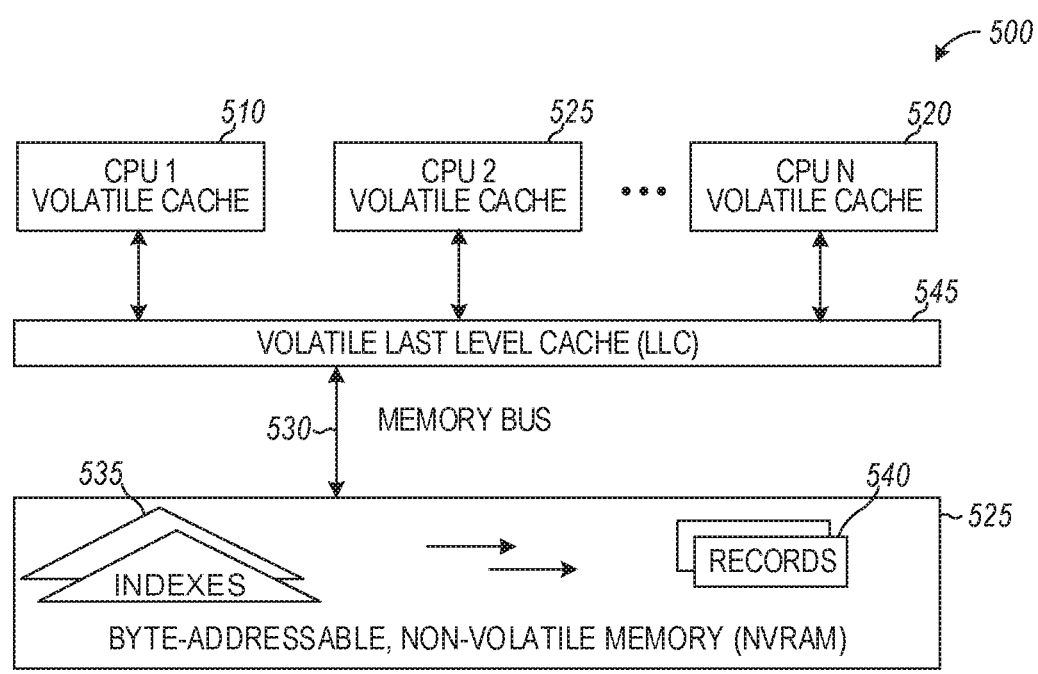
FIG. 5 is a block diagram of a single level system with NVRAM on a memory bus according to an example embodiment.

In one embodiment, PMwCAS may be implemented assuming system 500 like that shown in FIG. 5. System 500 includes one or more central processing units, CPU1 to CPUn shown at 510, 515, and 520, each of which may include volatile cache. System 500 has a single level store, with NVRAM 525 coupled directly to a memory bus 530. Indexes 535 and base data shown as records 540 reside on the NVRAM 525.

Access to NVRAM 525 is cached by multiple levels of volatile private and shared CPU caches, and is subject to re-ordering by the processor for performance reasons. A last level cache (LLC) 545 is shown coupled between the CPUs with volatile cache and the memory buss 530. Special care is taken to guarantee durability and ordering. This is typically done through a combination of cache write-backs and memory fences. In addition to memory fences and atomic 8-byte writes, the ability to selectively flush or write-back a cache line, e.g., is provided via the cache line write-back (CLWB) or cache line flush (CLFLUSH) instructions on Intel processors. Both of these instructions flush the target cache line to memory but CLFLUSH also evicts the cache line. This increases the number of memory accesses which slow down performance.

The PMwCAS operator may be used to atomically change multiple 8-byte words with persistence guarantees. The API for PMwCAS, as described in further detail above, is:

AllocateDescriptor(callback=default)
Descriptor::AddWord(address,expected,desired)
Descriptor::ReserveEntry(addr, expected, policy)
Descriptor::RemoveWord(address)
PMwCAS(descriptor)
Discard(descriptor)

The API is identical for both volatile and persistent MwCAS. Under the hood, PMwCAS provides all the needed persistence guarantees, without additional actions by the application.

Execution: To perform a PMwCAS, the application first allocates a descriptor and invokes the AddWord or ReserveEntry method once for each word to be modified. The application can use RemoveWord to remove a previously specified word if needed. AddWord and ReserveEntry ensure that target addresses are unique and return an error if they are not. Calling PMwCAS executes the operation, while Discard aborts it. A failed PMwCAS will leave all target words unchanged.

The word entries in the descriptor are kept in sorted order on the address field to prevent deadlock. During execution of the PMwCAS, the first phase in effect attempts to "lock" each target word. From concurrency control theory it is known that deadlocks cannot occur if all "clients" acquire locks (or other resources) in the same order.

Memory management: To ensure memory safety in a lock-free environment, descriptors are recycled by the PMwCAS and Discard functions using epoch-based reclamation. The user need not worry about descriptor memory. PMwCAS is most often used to update pointers to dynamically allocated memory. The callback parameter is provided if the user wishes to piggyback on PMwCAS's epoch-based reclamation protocol. The callbacks are invoked once it is determined that memory behind each pointer is safe to be recycled. The user can also specify a recycling policy (using ReserveEntry) to specify the circumstance under which a callback is invoked (e.g., recycling memory pointed to by old values after the PMwCAS succeeds).

In addition to memory recycling, the PMwCAS should correctly interact with the allocator and avoid leaking memory even if the system crashes in the middle of a PMwCAS operation. To handle this, ReserveEntry will return a pointer to the newly added entry's new value field, which can be given to a persistent memory allocator as the target location for storing the address of the allocated memory.

The PMwCAS operator has several salient features that make it attractive for lock-free programming in an NVRAM environment, especially for implementing high-performance indexes.

Easier programming: PMwCAS can greatly simplify the design and implementation of high performance lock-free code. The two indexing techniques described, double-linked skip list and the Bw-tree (in addition to the BzTree index described above), are much easier to implement by using PMwCAS. They, and non-trivial lock-free code in general, utilize atomic operations that span multiple words. Implementing atomic operations that require updating multiple words using only single-word CAS often results in complex and subtle code that is very hard to design. With PMwCAS, the implementation is almost as mechanical as a locked based implementation, but without the detriments of using locks.

Persistence guarantees: PMwCAS guards against tricky persistence bugs inherent in an NVRAM environment. For example, on persistent memory, updating a value v using a volatile CAS can lead to corruption. Since CAS does not guarantee persistence of v (CPU caches are not persistent), another thread might read v and take action (e.g., perform further writes) without a guarantee that v will become durable before a crash. The PMwCAS implementation ensures readers only see persistent values.

PMwCAS allows for the same index implementation to be used in both volatile DRAM as well as NVRAM with hardly any change. This reduces code complexity, simplifies code maintenance and allows one to transform a volatile data structure to a persistent data structure without application-specific recovery code. Internally, PMwCAS ensures crash consistency as long as the application's use of PMwCAS transforms the data structure from one consistent state to another.

Lock-free programming requires careful memory reclamation protocols, since memory cannot be freed under mutual exclusion. Memory management is even more difficult in an NVRAM environment, since subtle leaks might occur if the system crashes in the midst of an operation. For instance, a new node that was allocated but not yet added to the index will be leaked when the system crashes, unless care is taken. Index implementations can easily piggyback on the lock-free recycling protocol used by PMwCAS to ensure that memory is safely reclaimed after the success (or failure) of the operation and even after a crash.

Recent hardware transactional memory provides an alternative to PMwCAS as it could be used to atomically modify multiple NVRAM words. However, this approach is vulnerable to spurious aborts (e.g., caused by CPU cache size) and still requires application-specific recovery logic that is potentially complex.

To set the stage for describing an example PMwCAS implementation, a prior approach to building a single-word persistent CAS is described. To maintain data consistency across failures, a single-word CAS operation on NVRAM can proceed only if its target word's existing value is persistent in NVRAM. In general, inconsistencies may arise due to write-after-read dependencies where a thread persists a new value computed as the result of reading a value that might not be persisted. Such inconsistencies can be avoided by a flush-on-read principle: any load instruction must be preceded by a cache line flush (e.g., via CLFLUSH or CLWB) to ensure that the word is persistent in NVRAM. Flush-on-read is straightforward to implement but sacrifices much performance. Fortunately, there is a way to drastically reduce the number of flushes.

Most CAS operations operate on word-aligned pointers, so certain lower bits in the operands are always zero. For example, the lower two bits are always zero if the address is at least 4-byte aligned. Modern 64-bit x86 processors employ a "canonical address" design, where the microarchitecture only implements 48 address bits, leaving the higher 16 bits unused. These vacant bits can be used to help improve the performance of persistent CAS: a bit can be dedicated to indicate whether the value is guaranteed to be persistent. Such bit is referred to as a "dirty" bit. If the dirty bit is clear, the word is guaranteed to be persistent; otherwise the value might not be persistent. Thus, the protocol is that a store always sets the dirty bit and any thread accessing a word (either read/write) with the dirty bit set flushes it and then clears the dirty bit to avoid unnecessary, repetitive flushes.

Figure 6B:
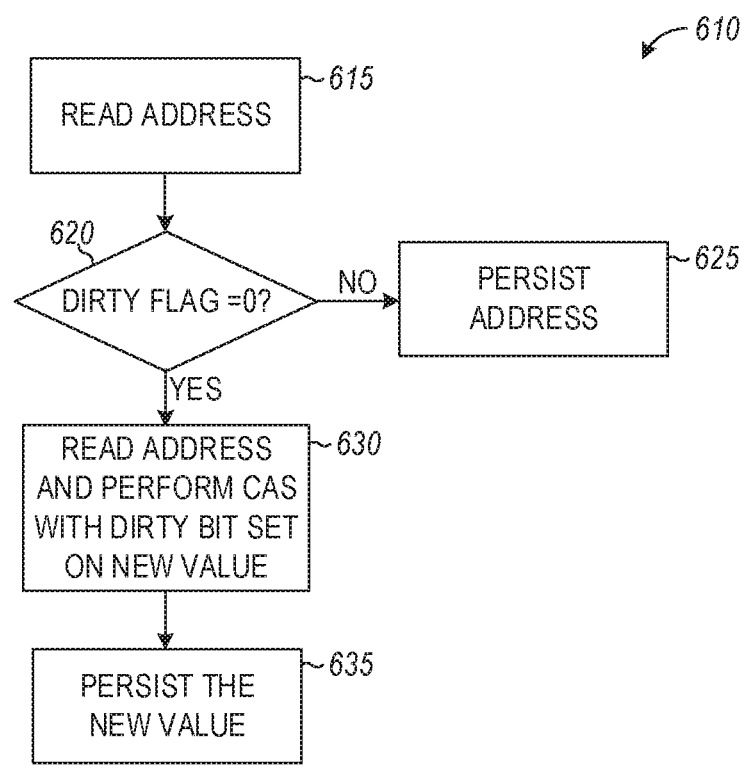
FIG. 6B is a flowchart of a method of performing a persistent CAS according to an example embodiment.

FIG. 6A illustrates an Algorithm 1 at 600 in example pseudocode and a more generalized method shown in flowchart form in FIG. 6B at 610, showing how single-word persistent CAS can be built following this principle. The DirtyFlag is a word-long constant with only the dirty bit set. Before executing the final CAS at line 10, the caller makes sure that the target word is durable by checking if the dirty bit is set and possibly flushes the word using the CLWB instruction (lines 3-4 and 13). Note that at line 14, a CAS must be used to clear the dirty bit as (1) there may be concurrent threads trying to also set the bit or (2) there may be concurrent threads attempting to change the word to another value. This step does not require a flush, however, since any read operation of words that might participate in the persistent CAS must be done through pcas_read in Algorithm 1.

Employing a dirty bit on the target field solves both problems of data consistency and performance. A thread can only read a target word after making sure the word is durable in NV RAM. Clearing the dirty bit after flushing avoids repetitive flushing, maintaining most benefits of write-back caching.

In a more general description of the method performed by Algorithm 1, at 610, the address of the word subject to the CAS operation is read at 615. At decision block 620, the dirty flag is checked. If the flag is not zero, the address is persisted at 625. If the dirty flag is zero, the address is read, and the CAS operation is performed at 630 with the dirty bit set on the new value for the address. The new value is then persisted at 635.

An example implementation of a multi-word version of a persistent CAS is now described using the principles discussed above. Access to the information needed by the multi-word CAS is persisted and correctly linearized.

Users of PMwCAS first allocate a descriptor using the API, and add per-word modifications using either the AddWord (in the case of 8-byte updates) or ReserveEntry(to install pointers to memory blocks larger than 8-bytes). The user performs the operation by issuing the PMwCAS command (or Discard if they wish to cancel). If the PMwCAS operation acknowledges success, the users is guaranteed that all the target words were updated atomically and will persist across power failures. On failure, the user is guaranteed that none of the updates are visible to other threads.

Figure 7:
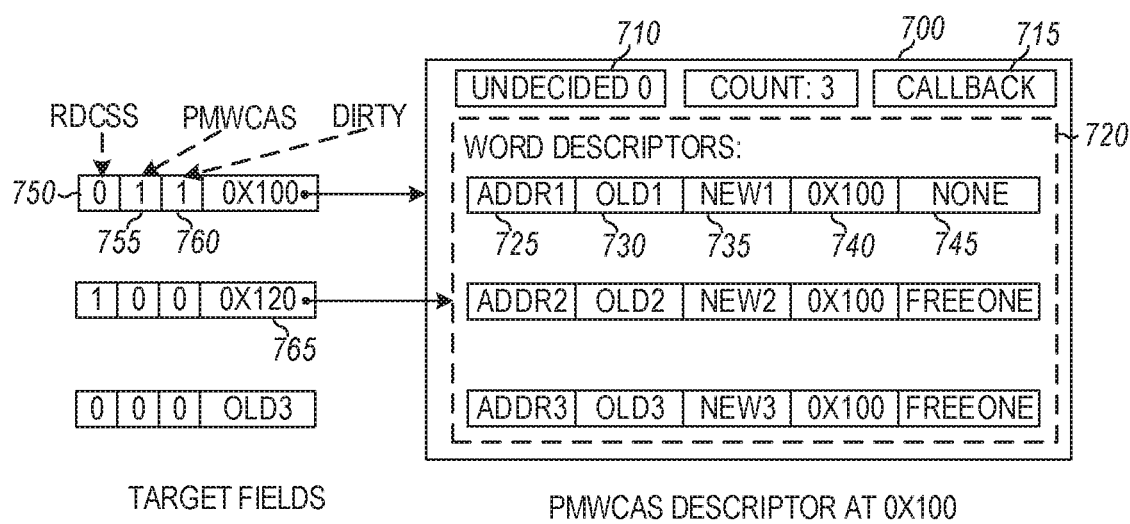
FIG. 7 illustrates fields of a PMwCAS operation descriptor according to an example embodiment.

The PMwCAS operator uses a descriptor that describes the operation to be performed and tracks it status. FIG. 7 shows the internals of a descriptor at 700. Descriptor 700 includes a status variable 710 that tracks the operation's progress, an optional pointer to a callback function 715, and an array of word descriptors 720. The callback function 715 is called when the descriptor is no longer needed and typically frees memory objects that can be freed after the operation has completed. The callback is not a raw function pointer (since the function may not map to the same address after a crash). Instead, an array is allocated for storing pointers to finalize callback functions and the array is filled in at startup. A descriptor then refers to a callback function by its position in the array instead of by its address.

A word descriptor contains (1) the target word's address 725, (2) the expected value 730 to compare against, (3) the new value 735, (4) a back pointer 740 to the containing descriptor, and (5) a memory deallocation policy 745. The policy field indicates whether the new and old values are pointers to memory objects and, if so, which objects are to be freed on completion (or failure) of the operation.

The example descriptor in FIG. 7 at 700 is currently in the initial Undecided status and looking to change three words at addr1, addr2, and addr3. All three word descriptors contain a back pointer to the descriptor at address 0x100 and policy specification.

The execution of a PMwCAS operation consists of two phases:
Phase 1: Install a pointer to the descriptor in all target addresses.
Phase 2: If Phase 1 succeeded, Phase 2 then installs the new values in all target addresses. If Phase 1 failed, then Phase 2 resets any target word that points to the descriptor back to its old value.

Another concurrent thread may read a word that contains a descriptor pointer instead of a "regular" value. If so, the thread helps complete the referenced PMwCAS before continuing. The following sections describe how PMwCAS works in more detail. Algorithm 2 as shown in example pseudocode in FIGS. 8A and 8B at 800 provides the entry point to PMwCAS. Since PMwCAS is cooperative, Algorithm 3 at 900 in FIGS. 9A and 9B illustrating example pseudocode that provides the entry point for readers (pmwcas_read), along with two common helper functions: install_mwcas_descriptor is the entry point to install a pointer to a descriptor at a particular address, while complete_install allows the reader to help along to complete an in-progress PMwCAS. FIG. 9C is a flowchart providing a generalized description of reading and help along routines for a PMwCAS operation at 910.

The PMwCAS first installs a pointer to the descriptor in each target word. Along the way, it or other reads may encounter another in-progress PMwCAS, for which it must help to complete. It then ensures persistence of the descriptor pointer writes before determining the final operation status.

Figure 8C:
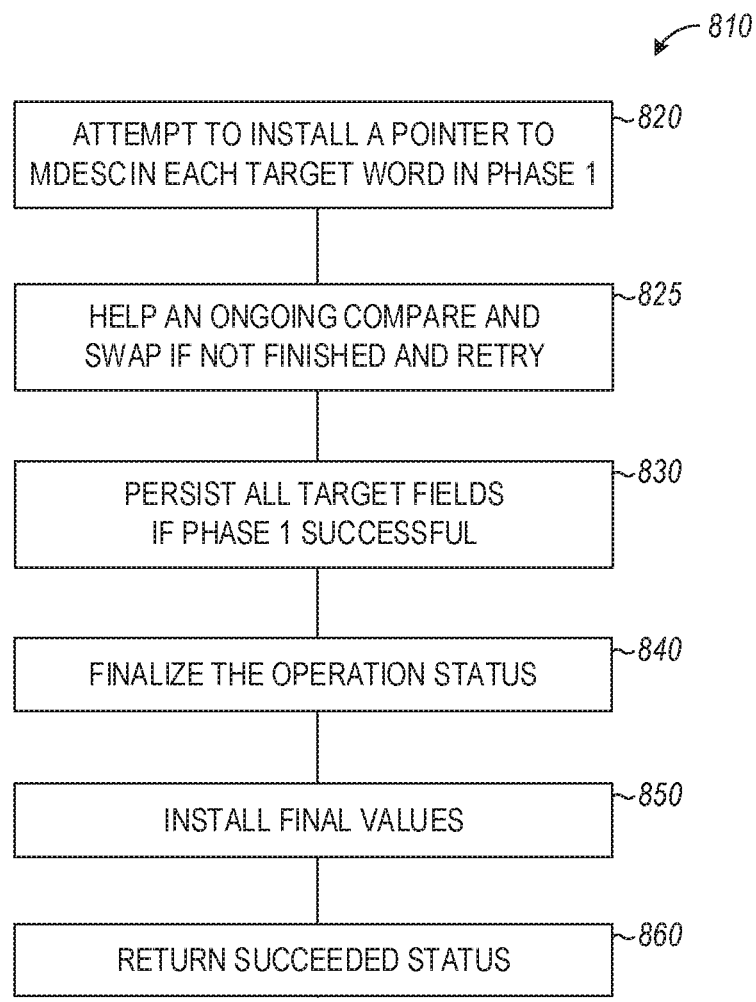
FIG. 8C is a flowchart of a method for providing an entry point to a PMwCAS operation according to an example embodiment.
Figure 9C:
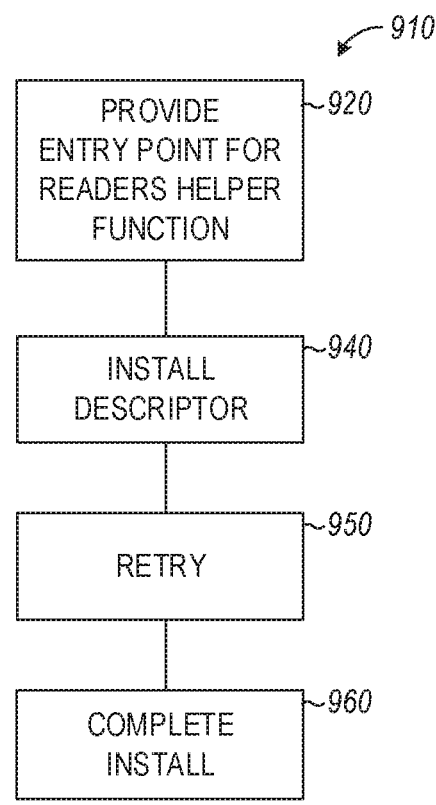
FIG. 9C is a flowchart of a method for providing an entry point for readers of a data structure according to an example embodiment.

For each target word in the descriptor mdesc, PMwCAS first attempts to install a pointer to mdesc in each target word as shown in Algorithm 2 800 lines 3-8 and at 820 in a more generalized flowchart shown at 810 in FIG. 8C. The installation uses a two-phase process called RDCSS that performs a double compare and a single swap to install the descriptor. RDCSS is necessary to guard against subtle race conditions and maintain a linearizable sequence of operations on the same target address. Specifically, Algorithm 2, 800, guards against the installation of a descriptor for a completed PMwCAS(p1) that might inadvertently overwrite the result of another PMwCAS(p2), where p2 should occur after p1. This can happen if a thread t executing p1 is about to install a descriptor in a target address a over an existing value v, but goes to sleep. While t sleeps, another thread may complete p1 (given the cooperative nature of PMwCAS) and subsequently p2 executes to set a back to v. If t were to wake up and try to overwrite v (the value it expects) in address a, it would actually be overwriting the result of p2, violating the linearizable schedule for updates to a. Using RDCSS to install a descriptor ensures not only that the target word contains the expected value but also that the status is Undecided, i.e., that the operation is still in progress.

The function install_mwcas_descriptor (lines 17-29 of Algorithm 3 at 900 and 940 in flowchart 910) is invoked for each target word in the PMwCAS descriptor. It receives the address of a word descriptor as the sole parameter and returns the value found in the target word. Algorithm 3 first uses a single-word CAS to install a pointer to the word descriptor at 940 in FIG. 9C (with the RDCSSFlag flag set) in the target word (lines 18-20 in FIG. 9B). If the target word already points to a word descriptor, the caller helps complete the corresponding RDCSS and then retries its own RDCSS (lines 21-24 in FIG. 9B and 950 in FIG. 9C). If the CAS succeeds, it proceeds to set the target word to point to the descriptor if status is Undecided (lines 26-28 and 31-34 in FIG. 9B, and 960 in FIG. 9C). If the PMwCAS has finished (status contains Succeeded or Failed), the installation fails and the target word is reset to the old value. Note that at line 12, the dirty bit is toggled when installing the descriptor to ensure correct recovery as discussed below.

FIG. 7 shows an example where the RDCSS 750 has successfully installed a pointer to the descriptor in the first target word. The PMwCAS 755 and dirty bits 760 are set to indicate that the field contains a descriptor pointer and the field content might not be durable on NVRAM. The second target address, however, still points to its word descriptor whose address is 0x120 at 765. Therefore, for this field, the caller could be executing lines 21-28 of Algorithm 3. The last target field is yet to be changed and still contains the old value. The result of the call to install_mwcas_descriptor (at line 5 of Algorithm 2) returns one of the following values when trying to install a pointer to descriptor mdesc. (1) A regular value that equals the expected old value, signaling success. (2) A regular value that does not equal the expected old value, signaling a lost race with another PMwCAS that installed a new value before our RDCSS could install the descriptor pointer. In this case the PMwCAS fails (lines 16-17). (3) The pointer value to mdesc, meaning another thread successfully completed the installation. (4) A pointer to the descriptor of another PMwCAS, in which case the caller helps to complete that operation (lines 9-14) before retrying the installation of mdesc. In all cases, if the return value's dirty bit is set, the field is persisted using the persist function defined in Algorithm 1 600.

Reading affected words: Phase 1 exposes pointers to a full descriptor or individual word descriptors to any thread reading one of the target words. Similar to the volatile MwCAS[13], a thread does not directly read words that may contain a descriptor pointer but instead calls pmwcas_read (lines 1-15 in Algorithm 3 900 in FIG. 9A, and 920 in FIG. 9C). pmwcas_read reads the word and checks whether it contains a descriptor pointer. If it does, the function then helps complete the operation by calling complete_install (lines 29-34 in Algorithm 3 900, 825 in FIG. 8C) or persistent_mwcas (Algorithm 2 800) depending on the descriptor type. It then retries reading the field and returns when the field contains a regular value. As shown on the left side of FIG. 7, the three vacant bits are used to indicate whether a word contains a pointer to a word descriptor, a pointer to a descriptor, and whether the value might not be persisted. They are represented in Algorithm 3 900 by RDCSSFlag, MwCASFlag, and DirtyFlag, which are constants with only the corresponding bit set. Similar to the pcas_read function in Algorithm 1, the reader must also flush the target word if the dirty bit is set, either on a descriptor pointer or normal value.

Precommit: Upon completing Phase 1, a thread then persists the target words whose dirty bit is set (lines 20-22 of Algorithm 2 800 in FIG. 8A, and 830 in FIG. 8C). To ensure correct recovery, the target words are persisted 830 before, updating the statusfield and advancing to Phase 2. The status field is updated using CAS to either Succeeded or Failed (with the dirty bit set) depending on whether Phase 1 succeeded or failed (line 25 of Algorithm 2 800). Next, the thread persists the status word and clears its dirty bit (lines 26-28 of Algorithm 2 800 to finalize 840 the status of the operation). Persisting the status field "commits" the operation, ensuring its effects survive even across power failures.

If Phase 1 succeeds, the PMwCAS is guaranteed to succeed, even if a failure occurs—recovery will roll forward with the new values recorded in the descriptor. If Phase 1 succeeded, Phase 2 installs the final values (with the dirty bit set) in the target words, replacing the pointers to the descriptor mdesc (lines 31-37 of Algorithm 2 800 and 850 in FIG. 8C). Since the final values are installed one by one using a CAS, it is possible that a crash in the middle of Phase 2 leaves some target fields with new values, while others point to the descriptor. Another thread might have observed some of the newly installed values and make dependent actions (e.g., performing a PMwCAS of its own) based on the read. Rolling back in this case might cause data inconsistencies. Therefore, status is persisted before entering Phase 2 and a succeeded status is returned at 860, line 38. The recovery routine can then rely on the statusfield of the descriptor to decide if it should roll forward or backward. The next section provides details of the recovery process.

If the PMwCAS fails in Phase 1, Phase 2 becomes a rollback procedure by installing the old values (with the dirty bit set) in all target words containing a descriptor pointer.

Due to the two-phase execution of PMwCAS, a target address may contain a descriptor pointer or normal value after a crash. Correct recovery requires that the descriptor be persisted before entering Phase 1. The dirty bit in the statusfield is cleared because the caller has not started to install descriptor pointers in the target fields; any failure that might occur before this point does not affect data consistency upon recovery.

A pool of descriptors is maintained within the NVRAM address space at a location predefined by the application. Upon restart from a failure, recovery starts by scanning the whole descriptor pool and processing each in-flight operation. Descriptors are reused facilitating maintenance of a small descriptor pool (a small multiple of the number of worker threads). Thus, scanning the pool during recovery is not time consuming.

Recovery is quite straightforward: if a descriptor's statusfield equals Succeeded, the operation is rolled forward; if it equals Failed or Undecided, the operation is rolled back; otherwise do nothing. For each descriptor md, iterate over each target word and check if it contains a pointer to mdor to the corresponding word descriptor. If either is the case, the old value is applied to the field if md.status equals Undecided or Failed; the new value is applied otherwise (i.e., when md.status equals Succeeded). Memory pointed to by the word descriptor's expected and desired values is freed according to the specified policy. The status field is then set to Free and the descriptor is ready for reuse.

In summary, using a fixed pool of descriptors enables the recovery procedure to easily find all in-flight PMwCAS operations after a crash. Persisting the descriptor before entering Phase 1 ensures that the operation can be correctly completed and persisting the statusfield after Phase 1 makes it possible to correctly decide whether to roll the operation forward or back.

The NVRAM space is used for storing descriptors and user data, i.e., the data structures being maintained, in our case, indexes. Words modified by PMwCAS often store pointers to memory acquired from a persistent allocator. The memory allocated should be owned by either the allocator or the data structure and not be left "hanging" after a crash. PMwCAS is designed to help avoid such memory leaks. Details of descriptor management and now provided, followed by a discussion of how PMwCAS ensures safe transfer of memory ownership.

In one embodiment, pool of descriptors is maintained in a dedicated area on NVRAM. The descriptor pool need not be big: it should only be large enough to support a maximum number of concurrent threads accessing a data structure (usually a small multiple of the hardware thread count). This scheme has several benefits. First, it aids recovery by having a single location to quickly identify PMwCAS operations that were in progress during a crash. Second, it gives more flexibility on storage management. The descriptor pool and data areas can be managed differently, depending on the user's choice, e.g., using different allocation strategies.

Allocation: Most lock-free data structures (including non-trivial ones like the Bw-Tree and a doubly-linked skip list) only require a handful (2-4) of words to be changed atomically. In one embodiment, the maximum number of target addresses in each descriptor is fixed. This allows treatment of the descriptor pool as a fixed sized array. With this scheme support various descriptor size classes may be supported, with each class maintaining a different number of max target addresses. In one embodiment, a fixed-size array is maintained for each class. Descriptor allocation lists are divided into per-thread partitions and threads are allowed to "borrow" from other partitions if its list is depleted.

One thorny issue in lock-free environments is detecting when memory can be safely reclaimed. In our case, we must be sure that no thread dereferences a pointer to a descriptor (swapped out in Phase 2) before we reclaim its memory. An epoch-based resource management approach may be used to recycle descriptors. Any thread should enter an epoch before dereferencing descriptors. The epoch value is a global value maintained by the system and advanced by user-defined events, e.g., by memory usage or physical time. After Phase 2, when the descriptor pointer has been removed from all target addresses, its pointer is place on a garbage list along with the value of the current global epoch, called the recycle epoch. The descriptor remains on the garbage list until all threads have exited epochs with values less than the descriptor's recycle epoch. This is sufficient to ensure that no thread can possibly dereference the current incarnation of the descriptor and it is free to reuse. The descriptor being removed from the garbage list first transitions to the Free status. It remains so and does not transition into the Undecided status until is ready to conduct another PMwCAS Employing the Free status aids recovery: without it, a crash that happened during descriptor initialization will cause the recovery routine to wrongfully roll forward or back.

A nice feature of having a descriptor pool is that garbage lists need not be persistent: they are only needed to guarantee safety during multi-threaded execution. Recovery, being single threaded, can scan the entire descriptor pool and does not need to worry about other concurrent threads accessing and changing descriptors.

It is assumed that the memory area for user data is managed by a persistent memory allocator. The allocator must be carefully crafted to ensure safe transfer of memory ownership. The problem is best explained by the following C/C++ statement for allocating eight bytes of memory: void *p=malloc(8). At runtime, the statement is executed in two steps: (1) the allocator reserves the requested amount of memory and (2) store the address of the allocated memory in p. Step (2) transfers the ownership of the memory block from the allocator to the application. When step 2 finishes, the application owns the memory. A naive implementation that simply stores the address in p could leak memory if a failure happens before p is persisted in NVRAM or if p is in DRAM. After a crash, the system could end up in a state where a memory block is "homeless" and cannot be reached from neither the application nor the allocator.

One solution is breaking the allocation process into two steps: reserve and activate, which allocates memory and transfers its ownership to the application, respectively. The allocator ensures crash consistency internally for the reservation step, which is opaque to the application. However, the application must carefully interact with the al locator in the activation process, through an interface (provided by the allocator) that is similar to posix_memalign which accepts a reference of the target location for storing the address of the allocated memory. This design is employed by many existing NVRAM systems. The application owns the memory only after the allocator has successfully persisted the address of the newly allocated memory in the provided reference.

PMwCAS may work with existing allocators that expose the above activation interface, to guarantee safe memory ownership transfer. Without PMwCAS, a lock-free data structure would use the persistent CAS primitive and handle possible failures in step 2. Since this approach does not guarantee safe transfer of memory ownership, it could significantly increase code complexity.

Safe Memory Ownership Transfer in PMwCAS. To avoid memory leaks PMwCAS descriptors may be used as temporary owners of allocated memory blocks until they are incorporated into the application data structure. As described earlier, an allocation interface similar to posix_memalign that passes a reference of the target location for storing the address of the allocated memory may be used. The application may be used to pass to the allocator the address of the new_valuefield in the word descriptor of the target word. Memory is owned by the descriptor after the allocator has persistently stored the address of the memory block in the new_value field.

During recovery, the memory allocator runs its recovery procedure first. Allocator recovery results in every pending allocation call being either completed or rolled back. As a result, all the "delivery addresses" contain either the address of an allocated memory block or a null pointer. After the allocator's recovery phase, PMwCAS's recovery mechanism may be used to roll forward or back in-flight PMwCAS operations.

Lock-free data structures must support some form of safe memory reclamation, given that deallocation is not protected by mutual exclusion. In other words, threads can dereference a pointer to a memory block even after it has been removed from a data structure. By allowing the application to piggyback on the descriptor recycling framework, the application is freed from implementing its own memory reclamation mechanism.

In lock-free implementations, memory chunks pointed to by the old_value or new_value fields normally do not acquire new accesses if the PMwCAS succeeded or failed, respectively. An application is allowed to specify a memory recycling policy for each target word. The policy defines how the memory pointed to by the old_value and new_value fields should be handled when the PMwCAS concludes and no thread can dereference the corresponding memory (based on the epoch safety guarantee discussed previously). The policy is stored in an additional field in the word descriptor. The different recycling options are described in FIG. 10 illustrating a table 1000. Table 1000 includes a policy column 1010, a meaning 1015 of the policy, and an example usage 1020.

Rather than providing customized per-word policies, the application can provide a customized "finalize" function that will be called when a descriptor is about to be recycled. This is useful in scenarios where the application needs more control over the memory deallocation process. For example, instead of simply calling free( ) on a memory object, an object-specific destructor needs to be called.

Figure 11B:
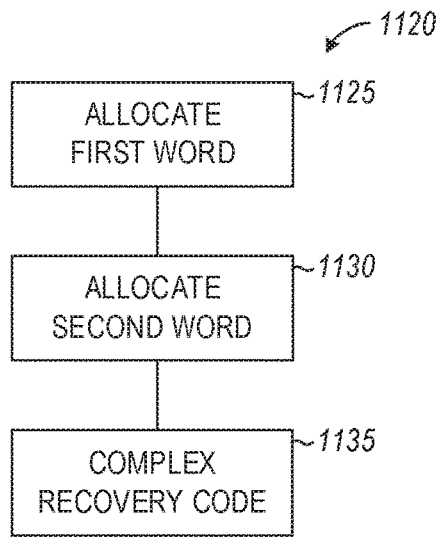
FIG. 11B is a flowchart of a method for allocating two words using a single-word CAS according to an example embodiment.

FIG. 11A shows pseudocode examples of allocating and installing two 8-byte words using a single-word persistent CAS at 1110 and PMwCAS at 1115. The use of a single word persistent CAS is also shown in flowchart form in FIG. 11B at 1120. At 1125, the first wad is allocated, and at 1130, the second word is allocated Note that at 1135, complex recovery code is required to ensure persistence.

Figure 11C:
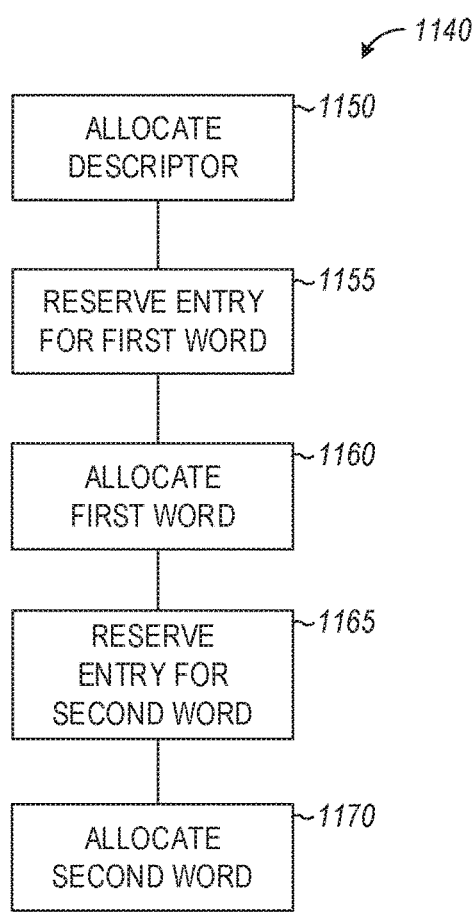
FIG. 11C is a flowchart of a method for allocating two words using a persistent multi-word CAS according to an example embodiment.

At PMwCAS 1115 in FIG. 11A, and as also represented at 1140 in flowchart form in FIG. 11C, the application first allocates a PMwCAS descriptor (line 1, 1150 in FIG. 11C) and then reserves a slot in the descriptor using ReserveEntry (lines 2 and 4, 1155 and 1165 for the first and second words respectively). ReserveEntry works exactly the same as AddEntry except that it does not require the application to pass the new value and will return a reference (pointer) to the new_valuefield of the newly added entry. The reference is further fed to the allocator (lines 2 and 5, and 1160 and 1170 for the first and second words respectively) for memory allocation. The application also specifies a FreeOne recycle policy when calling ReserveEntry: if the PMwCAS succeeded, then the memory pointed to by both old_value fields will be freed (respecting epoch boundaries); otherwise the new_values will be freed. Note that since the PMwCAS operation is inherently persistent, no complex recover code is needed.

PMwCAS may be used to simplify the implementation of highly concurrent indexes on NVRAM. Focus is on two lock-free range indexes: a doubly-linked skip list and the Bw-tree. Key-sequential access methods are used since they are ubiquitous (all databases need to support range scans efficiently). Such methods also require non-trivial implementation effort to achieve high performance; these implementations are usually lock-free in modern main-memory systems. Of course, the use of PMwCAS applies beyond indexing; one can use it to ease the implementation of any lock-free protocol that requires atomically updating multiple arbitrary memory words.

A skip list can be thought of as multiple levels of linked lists. The lowest level maintains a linked list of all records in key-sequential order. Higher level lists consist of a sparser subsequence of keys than levels below. Search starts from the top level of a special head node, and gradually descends to the desired key at the base list in logarithmic time. To implement a lock-free singly-linked (unidirectional) skip list, a record is inserted into the base list using a single-word CAS. At this point the record is visible since it will appear in a search of the base list. If the new key must be promoted to higher-level lists, this can be done lazily.

While a lock-free singly-linked skip list is easy to implement, it comes at a price: reverse scan is often omitted or supported inefficiently. Some systems "remember" the predecessor nodes in a stack during forward scans and use it to guide a reverse scan. A more natural way to support reverse scan is making the skip list doubly-linked, with a next and previous pointer in each node. While efficient, this approach requires complex hand-in-hand CAS operations list at each level.

Common solutions to implementing lock-free doubly-linked skip lists using a single-word CAS are complicated and error-prone. The state-of-the-art method first inserts a record at each level as if inserting into a singly linked list (making a predecessor point to its new successor). A second phase then tries to install previous pointers from successor to new predecessor using a series of CAS operations. The complexity of this approach comes from the second phase having to detect races with simultaneous inserts and deletes that interfere with the installation of the previous pointer. If such a race is detected, the implementation must fix up and retry the operation. A majority of the code from this approach is dedicated handling such races. Earlier designs often sacrifice features (e.g., deletion) for easier implementation.

Doubly-linked skip list: In one embodiment, a doubly-linked skip list may be formed using multiple levels of lock-free doubly-linked lists. Each node points to its predecessor and successor in the same level, and to the lower level node in the same tower. Inserting (deleting) a node involves first inserting (deleting) in the base level, and then inserting (deleting) upper level nodes containing the record key. For a volatile implementation, PMwCAS(with persistence guarantees disabled) may be used to atomically install a node n in each doubly-linked list by specifying the two pointers to atomically update: the next pointer at n's predecessor and previous pointer at n's successor. Compared to the CAS based implementation, the lines of code for the PMwCAS implementation may be reduced by 24%. PMwCAS makes the implementation almost as easy as a lock-based implementation, evidenced by a 43% reduction on cyclomatic complexity.

The transition from volatile to persistent implementation on NVRAM is seamless. The core insert/delete logic remains the same, but with additional memory management code. If inserting a node, the implementation allocates the node using a persistent allocator to ensure persistence and proper ownership handoff. Upon allocating the PMwCAS descriptor, the appropriate values are added to its new_value and old_value fields.

Since PMwCAS always transforms the skip list from one consistent state to another, the default recovery and memory reclamation mechanisms may be used to maintain data consistency across failures. No special-purpose recovery routine is needed. For a new node insertion, one can use the "FreeNewOnFailure" policy to ensure the new node memory is reclaimed in case the PMwCAS fails. For delete, one would specify the "FreeOldOnSuccess" policy to recycle the deleted node after the PMwCAS succeeds.

Figure 12A:
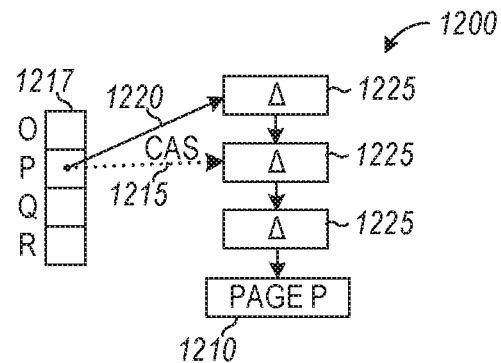
FIG. 12A illustrates a delta update to a BwTree according to an example embodiment.

Bw-Tree Implementation:

The Bw-tree is a lock-free B+-tree. It maintains a mapping table that maps logical page identifiers (LPIDs) to virtual addresses. All links between Bw-tree nodes are LPIDs, meaning a thread traversing the index uses the mapping table to translate each LPID to a page pointer. The Bw-tree uses copy-on-write to update pages. An update creates a delta record describing the update and prepends it to the target page. Deltas are installed using a single-word CAS that replaces the current page address in the mapping table with the address of the delta. FIG. 12A at 1200 depicts a delta update to page P 1210; the dashed line 1215 represents P's original address in the mapping table 1217, while the solid line 1220 represents P's new address. Pages are consolidated once a number of deltas 1225 accumulate on a page to prevent degradation of search performance.

Figure 12B:
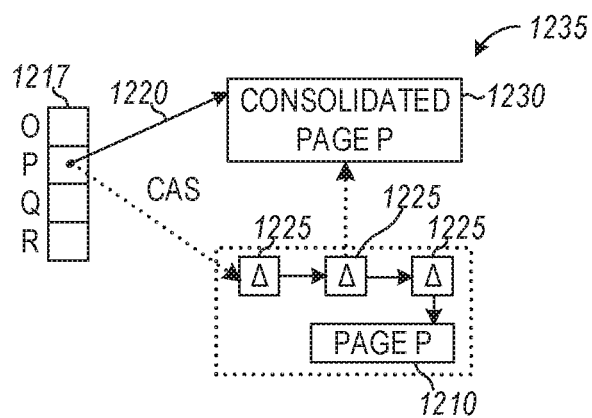
FIG. 12B illustrates a page consolidation of a BwTree according to an example embodiment.

Consolidation involves creating a new compact (search-optimized) page 1230 with all delta updates applied that replaces the old page version using a CAS as indicated in FIG. 12B at 1235.

Figure 12C:
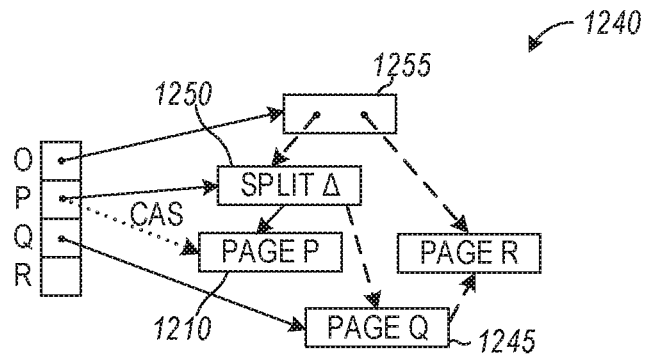
FIG. 12C illustrates installing a split delta to a BwTree according to an example embodiment.

Structure modification operations (SMOs) such as page splits and merges cause complexity in the Bw-tree, since they introduce changes to more than one page and we cannot update multiple arbitrary nodes using a single-word CAS. The Bw-tree breaks an SMO into a sequence of atomic steps; each step is installed using a CAS to a single page. FIG. 12C at 1240 depicts the two-phase split for a page P 1210. Phase 1 selects an appropriate separator key K, generates a new sibling page Q 1245 and installs a "split delta" 1250 on P that logically describes the split and provides a side-link to the new sibling Q 1245. Phase 2 inserts K into the parent node O 1255 by posting a delta containing (K, LPID) with a CAS. Deleting and merging pages in the Bw-tree follows a similar process with three atomic steps.

Figure 12D:
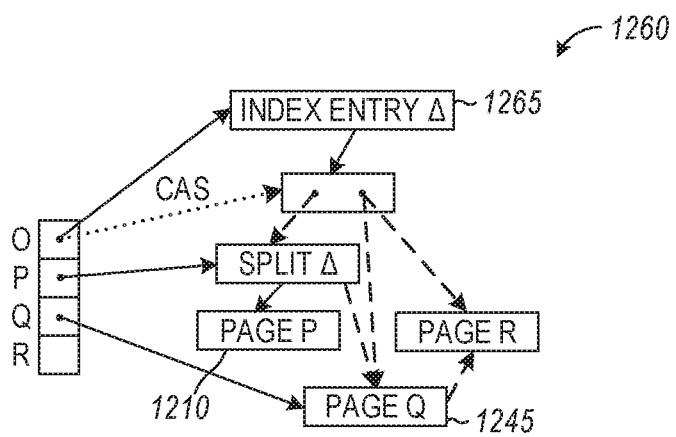
FIG. 12D illustrates installing an index entry delta to a BwTree according to an example embodiment.

FIG. 12D at 1260 shows installing an index entry delta 1265 into page Q 1245.

While highly concurrent, the Bw-tree contains several subtle race conditions as a result of the SMO protocol. For example, threads can observe "in progress" SMOs, so the implementation must detect and handle such conflicts. A Bw-tree thread that encounters a partial SMO will "help along" to complete it before continuing with its own operation. Also, in-progress SMOs can "collide," and without care, lead to index corruption. A prime example is that simultaneous splits and merges on the same page could collide at the parent. This happens, for instance, when a thread t1 sees an in-progress split of a page P with new sibling Q and attempts to help along by installing a new key/pointer pair for Q at a parent O. In the meantime, another thread t2 could have deleted Q and already removed its entry at O (which was installed by another thread t3). In this case t1 must be able to detect the fact that Q was deleted and avoid modifying O. A large amount of code (and thought) is dedicated to detecting and handling subtle cases like these.

PMwCAS may be used to simplify the Bw-tree SMO protocol and reduce the subtle races just described. The approach "collapses" the multi-step SMO into a single PMwCAS. A page split is used as a running example; a page delete/merge follows a similar approach. For a volatile implementation, a split of page P first allocates a new sibling page, along with memory for both the split and index deltas. It can then use the PMwCAS(with persistence disabled) to atomically install the split delta on P and the index delta at the parent. The split may trigger further splits at upper levels, in which case the process is repeated for the parent.

MwCAS allows cutting all the help-along code in the CAS based implementation and reduces cyclomatic complexity of SMOs by 24%. MwCAS makes the code much easier to reason about and less error-prone with a simpler control flow.

The transition from volatile to persistent implementation is seamless. The logic for the SMOs remains the same. However, in addition the code must conform to memory-handling procedures described, starting with allocating a PMwCAS descriptor. Then, for each new memory page allocated (the new page Q along with split and index deltas), a slot is reserved in the descriptor and the persistent allocator is passed a reference to the reserved slot's new_value field. For memory reclamation, the "FreeNewOnFailure" policy that will recycle this new memory if the PMwCAS fails is used. The process of merging two pages works similarly to the split, by specifying the required mapping table entries to change and relying on PMwCAS's memory safety guarantee.

Certain Bw-tree operations are single-word in nature, e.g., installing a delta record or consolidating a page. In the volatile case, CAS in the presence of PMwCAS may be used as long as the flag bits needed by PMwCAS are not used by CAS. But in the persistent case installing delta records with CAS loses the safe persistence guarantee provided by PMwCAS as the transfer of memory ownership will be unknown to the descriptor. Therefore, PMwCAS even is used for single-word updates for the persistent Bw-tree implementation.

Figure 13:
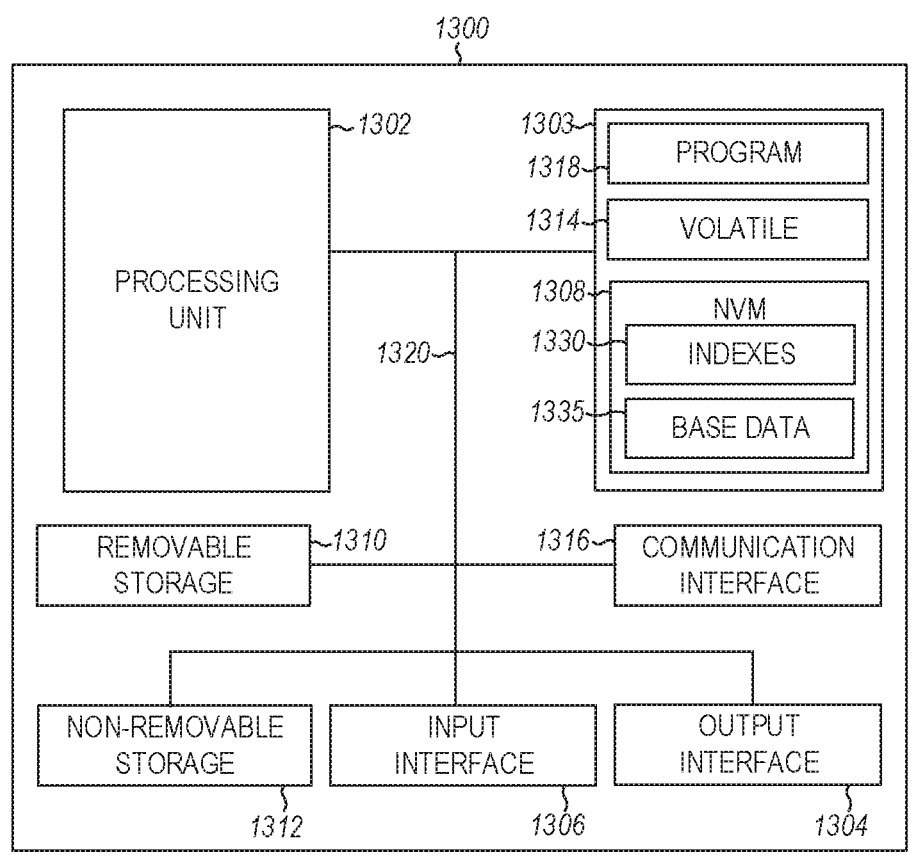
FIG. 13 is a block diagram of a computer system for storing data structures and performing PMwCAS operations on the data structure according to an example embodiment.

FIG. 13 is a block schematic diagram of a computer system 1300 to implement methods according to example embodiments. Computer system 1300 may be used for storing data structures and performing PMwCAS operations on the data structure All components need not be used in various embodiments.

One example computing device in the form of a computer 1300 may include a processing unit 1302, memory 1303, removable storage 1310, and non-removable storage 1312. Although the example computing device is illustrated and described as computer 1300, the computing device may be in different forms in different embodiments. For example, the computing device may instead be a smartphone, a tablet, smartwatch, or other computing device including the same or similar elements as illustrated and described with regard to FIG. 13. Devices, such as smartphones, tablets, and smartwatches, are generally collectively referred to as mobile devices or user equipment. Further, although the various data storage elements are illustrated as part of the computer 1300, the storage may also or alternatively include cloud-based storage accessible via a network, such as the Internet or server based storage.

Memory 1303 may include volatile memory 1314 and non-volatile memory 1308. In some embodiments, system 1300 utilizes a single-level store 1303 and has NVM 1308 directly attached to the memory bus 1320. Indexes 1330 or other data structures, and base data 1335 reside in NVM. The system 1300 may also contain DRAM 1314 for use as working storage.

Computer 1300 may include—or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1300 may include or have access to a computing environment that includes input interface 1306, output interface 1304, and a communication interface 1316. Output interface 1304 may include a display device, such as a touchscreen, that also may serve as an input device. The input interface 1306 may include one or more of a touchscreen, touchpad, mouse, keyboard, camera, one or more device-specific buttons, one or more sensors integrated within or coupled via wired or wireless data connections to the computer 1300, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1300 are connected with a system bus 1320.

Computer-readable instructions stored on a computer-readable medium are executable by the processing unit 1302 of the computer 1300, such as a program 1318. The program 1318 in some embodiments comprises software that, when executed by the processing unit 1302, performs network switch operations according to any of the embodiments included herein. A hard drive, CD-ROM, and RAM are some examples of articles including a non-transitory computer-readable medium such as a storage device. The terms computer-readable medium and storage device do not include carrier waves or propagating signals to the extent carrier waves are deemed too transitory. Storage can also include networked storage, such as a storage area network (SAN). Computer program 1318 may be used to cause processing unit 1302 to perform one or more methods or algorithms described herein.

BzTree Examples

In example 1 computer implemented method includes receiving multiple requests to update a data structure stored in non-volatile memory (NVM) and applying an atomic multiword update to the data structure to arbitrate access to the NVM.

Example 2 includes the aspects of 1 wherein the data structure comprises a lock free B+ tree.

Example 3 includes the aspects of example 2 wherein the B+ tree includes internal nodes that store search keys and pointers to child nodes and leaf nodes that store keys and either record pointer or actual payload values.

Example 4 includes the aspects of any of examples 2-3 wherein the B+-tree includes a root pointer to a root node to an index, and a global index epoch that is updated responsive to a failure.

Example 5 includes the aspects of any of examples 1-4 wherein the atomic multiword update comprises a persistent multi-word compare-and-swap (PMwCAS) operation.

Example 6 includes the aspects of example 5 and further comprising recovering the data structure following a failure by rolling back or forward PMwCAS operations that where in-flight during the failure.

Example 7 includes the aspects of any of examples 1-6 wherein the atomic multiword update tracks metadata for an update operation in a descriptor table.

Example 8 includes the aspects of example 7 wherein the descriptor table metadata includes an update operation status, multiple target word addresses, expected old values, new values, and a dirty bit.

Example 9 includes the aspects of example 8 wherein the descriptor table further includes a memory recycling policy value.

Example 10 includes the aspects of any of examples 8-9 wherein the dirty bit is used to signify that a value is volatile and should be flushed by a reader and unset prior to reading the value.

In example 11, a computer readable storage device has instructions for execution by computing resources to perform operations. The operations include receiving multiple requests to update a data structure stored in non-volatile memory (NVM), and applying an atomic multiword update to the data structure to arbitrate access to the NVM.

Example 12 includes the aspects of example 11 wherein the data structure comprises a lock free B+ tree that includes internal nodes that store search keys and pointers to child nodes, leaf nodes that store keys and either record pointer or actual payload values, a root pointer to a root node to an index, and a global index epoch that is updated responsive to a failure.

Example 13 includes the aspects of any of examples 11-12 wherein the atomic multiword update comprises a persistent multi-word compare-and-swap (PMwCAS) operation.

Example 14 includes the aspects of example 13 and further comprising recovering the data structure following a failure by rolling back or forward PMwCAS operations that where in-flight during the failure.

Example 15 includes the aspects of any of examples 11-14 wherein the atomic multiword update tracks metadata for an update operation in a descriptor table, wherein the descriptor table metadata includes an update operation status, multiple target word addresses, expected old values, new values, and a dirty bit.

Example 16 includes the aspects of example 15 wherein the dirty bit is used to signify that a value is volatile and should be flushed by a reader and unset prior to reading the value.

In example 17, a device includes a processor and a memory device coupled to the processor and having a program stored thereon for execution by the processor to perform operations. The operations include receiving multiple requests to update a data structure stored in non-volatile memory (NVM) and applying an atomic multiword update to the data structure to arbitrate access to the NVM.

Example 18 includes the aspects of example 17 wherein the data structure comprises a lock free B+ tree that includes internal nodes that store search keys and pointers to child nodes, leaf nodes that store keys and either record pointer or actual payload values, a root pointer to a root node to an index, and a global index epoch that is updated responsive to a failure.

Example 19 includes the aspects of any of examples 17-18 wherein the atomic multiword update comprises a persistent multi-word compare-and-swap (PMwCAS) operation and wherein the operations further comprise recovering the data structure following a failure by rolling back or forward PMwCAS operations that where in-flight during the failure.

Example 20 includes the aspects of any of examples 17-19 wherein the atomic multiword update tracks metadata for an update operation in a descriptor table, wherein the descriptor table metadata includes an update operation status, multiple target word addresses, expected old values, new values, and a dirty bit, wherein the dirty bit is used to signify that a value is volatile and should be flushed by a reader and unset prior to reading the value.

PMwCAS Examples

In example 1, a computer implemented method includes allocating a descriptor for a persistent multi-word compare-and-swap operation (PMwCAS), specifying targeted addresses of words to be modified, returning an error if one of the targeted addresses contains a value not equal to a corresponding compare value, executing the operation atomically if the targeted addresses contain values that match corresponding compare values, and aborting the operation responsive to the returned error.

Example 2 includes the aspects of example 1 and further comprising maintaining PMwCAS operation metadata in a descriptor table that includes an update operation status, multiple target word addresses, expected old values, new values, and a dirty bit.

Example 3 includes the aspects of example 2 wherein the descriptor table further includes a memory recycling policy value.

Example 4 includes the aspects of any of examples 2-3 wherein the dirty bit signifies that a value is volatile and should be flushed by a reader and unset prior to reading the value.

Example 5 includes the aspects of any of examples 1-4 wherein the PMwCAS operation includes an application programming interface with instructions including:
  an AllocateDescriptor(callback=default) instruction;
  a Descriptor::AddWord(address,expected,desired) instruction;
  a Descriptor::ReserveEntry(addr, expected, policy) instruction;
  a Descriptor::RemoveWord(address) instruction;
  a PMwCAS(descriptor) instruction; and
  a Discard(descriptor) instruction.

Example 6 includes the aspects of example 5 wherein the AllocateDescriptor(callback=default) instruction allocates a descriptor, the Descriptor::AddWord(address,expected,desired) instruction specifies a word to be modified, the Descriptor::ReserveEntry(addr, expected, policy) instruction reserves an address for a value left unspecified, Descriptor::RemoveWord(address) instruction removes a word previously specified, PMwCAS(descriptor) instruction executes the PMwCAS and returns true if successful, and Discard(descriptor) instruction indicates that no specified word will be modified.

Example 7 includes the aspects of examples 1-6 wherein the operation includes two phases including installing a pointer to the descriptor in all addresses of words to be modified, and if the pointers were successfully installed, installing new values in all of the addresses of the words to be modified.

Example 8 includes the aspects of example 7 and further including if a pointer installation fails, reset a word to be modified back to its old value.

Example 9 includes the aspects of example 8 and further including reading a word that contains a descriptor pointer instead of a value and responsive to reading a word that contains a descriptor pointer, helping to complete a referenced operation before continuing.

In example 10, a machine-readable storage device has instructions for execution by a processor of the machine to perform operations. The operations include allocating a descriptor for a persistent multi-word compare-and-swap operation (PMwCAS), specifying targeted addresses of words to be modified, returning an error if one of the targeted addresses contains a value not equal to a corresponding compare value, executing the operation atomically if the targeted addresses contain values that match corresponding compare values, and aborting the operation responsive to the returned error.

Example 11 includes the aspects of example 10 and further including maintaining PMwCAS operation metadata in a descriptor table that includes an update operation status, multiple target word addresses, expected old values, new values, and a dirty bit.

Example 12 includes the aspects of example 11 wherein the dirty bit signifies that a value is volatile and should be flushed by a reader and unset prior to reading the value.

Example 13 includes the aspects of any of examples 10-12 wherein the PMwCAS operation includes an application programming interface with instructions including an AllocateDescriptor(callback=default) instruction;
a Descriptor::AddWord(address,expected,desired) instruction;
a Descriptor::ReserveEntry(addr, expected, policy) instruction;
a Descriptor::RemoveWord(address) instruction;
a PMwCAS(descriptor) instruction; and
a Discard(descriptor) instruction.

Example 14 includes the aspects of example 13 wherein the AllocateDescriptor(callback=default) instruction allocates a descriptor, the Descriptor::AddWord(address,expected,desired) instruction specifies a word to be modified, the Descriptor::ReserveEntry(addr, expected, policy) instruction reserves an address for a value left unspecified, Descriptor::RemoveWord(address) instruction removes a word previously specified, PMwCAS(descriptor) instruction executes the PMwCAS and returns true if successful, and Discard(descriptor) instruction indicates that no specified word will be modified.

Example 15 includes the aspects of example 15 wherein the operations include two phases including installing a pointer to the descriptor in all addresses of words to be modified and if the pointers were successfully installed, installing new values in all of the addresses of the words to be modified.

Example 16 includes the aspects of 16 example 15 and further including if a pointer installation fails, reset a word to be modified back to its old value, reading a word that contains a descriptor pointer instead of a value, and responsive to reading a word that contains a descriptor pointer, helping to complete a referenced operation before continuing.

In example 17, a device includes a processor and a memory device coupled to the processor and having a program stored thereon for execution by the processor to perform operations. The operations include allocating a descriptor for a persistent multi-word compare-and-swap operation (PMwCAS), specifying targeted addresses of words to be modified, returning an error if one of the targeted addresses contains a value not equal to a corresponding compare value, executing the operation atomically if the targeted addresses contain values that match corresponding compare values, and aborting the operation responsive to the returned error.

Example 18 includes the aspects of example 17 and further comprising maintaining PMwCAS operation metadata in a descriptor table that includes an update operation status, multiple target word addresses, expected old values, new values, and a dirty bit, wherein the dirty bit signifies that a value is volatile and should be flushed by a reader and unset prior to reading the value.

Example 19 includes the aspects of examples 17-18 wherein the PMwCAS operation includes an application programming interface with instructions comprising:

an AllocateDescriptor(callback=default) instruction;
a Descriptor::AddWord(address,expected,desired) instruction;
a Descriptor::ReserveEntry(addr, expected, policy) instruction;
a Descriptor::RemoveWord(address) instruction;
a PMwCAS(descriptor) instruction; and
a Discard(descriptor) instruction, wherein the AllocateDescriptor(callback=default) instruction allocates a descriptor, the Descriptor::AddWord(address, expected,desired) instruction specifies a word to be modified, the
Descriptor::ReserveEntry(addr, expected, policy) instruction reserves an address for a value left unspecified,
Descriptor::RemoveWord(address) instruction removes a word previously specified, PMwCAS(descriptor) instruction executes the PMwCAS and returns true if successful, and Discard(descriptor) instruction indicates that no specified word will be modified.

Example 20 includes the aspects of any of examples 17-19 wherein the operation includes two phases including installing a pointer to the descriptor in all addresses of words to be modified and if the pointers were successfully installed, installing new values in all of the addresses of the words to be modified, and further including if a pointer installation fails, reset a word to be modified back to its old value, reading a word that contains a descriptor pointer instead of a value, and responsive to reading a word that contains a descriptor pointer, helping to complete a referenced operation before continuing.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving multiple requests to update a data structure stored in non-volatile memory (NVM); and
applying an atomic multiword update to the data structure to arbitrate access to the NVM, wherein the atomic multiword update tracks metadata for an update operation in a descriptor table that includes a dirty bit used to signify that a value is volatile and should be flushed by a reader and unset prior to reading the value.

2. The method of claim 1 wherein the data structure comprises a lock free B+ tree.

3. The method of claim 2 wherein the B+ tree includes internal nodes that store search keys and pointers to child nodes and leaf nodes that store keys and either record pointer or actual payload values.

4. The method of claim 2 wherein the B+ tree includes a root pointer to a root node to an index, and a global index epoch that is updated responsive to a failure.

5. The method of claim 1 wherein the atomic multiword update comprises a persistent multi-word compare-and-swap (PMwCAS) operation.

6. The method of claim 5 and further comprising recovering the data structure following a failure by rolling back or forward PMwCAS operations that were in-flight during the failure.

7. The method of claim 1 wherein the descriptor table metadata includes an update operation status, multiple target word addresses, expected old values, and new values.

8. The method of claim 7 wherein the descriptor table further includes a memory recycling policy value.

9. A computer-readable storage device having instructions for execution by computing resources to perform operations comprising:
receiving multiple requests to update a data structure stored in non-volatile memory (NVM); and
applying an atomic multiword update to the data structure to arbitrate access to the NVM, wherein the atomic multiword update tracks metadata for an update operation in a descriptor table that includes a dirty bit used to signify that a value is volatile and should be flushed by a reader and unset prior to reading the value.

10. The computer-readable storage device of claim 9 wherein the data structure comprises a lock free B+ tree that includes internal nodes that store search keys and pointers to child nodes, leaf nodes that store keys and either record pointer or actual payload values, a root pointer to a root node to an index, and a global index epoch that is updated responsive to a failure.

11. The computer-readable storage device of claim 9 wherein the atomic multiword update comprises a persistent multi-word compare-and-swap (PMwCAS) operation.

12. The computer-readable storage device of claim 11 and further comprising recovering the data structure following a failure by rolling back or forward PMwCAS operations that were in-flight during the failure.

13. The computer-readable storage device of claim 9 wherein the descriptor table metadata includes an update operation status, multiple target word addresses, expected old values, and new values.

14. A device comprising: a processor; and a memory device coupled to the processor and having a program stored thereon for execution by the processor to perform operations comprising: receiving multiple requests to update a data structure stored in non-volatile memory (NVM); and applying an atomic multiword update to the data structure to arbitrate access to the NVM, wherein the atomic multiword update tracks metadata for an update operation in a descriptor table that includes a dirty bit used to signify that a value is volatile and should be flushed by a reader and unset prior to reading the value.

15. The device of claim 14 wherein the data structure comprises a lock free B+ tree that includes internal nodes that store search keys and pointers to child nodes, leaf nodes that store keys and either record pointer or actual payload values, a root pointer to a root node to an index, and a global index epoch that is updated responsive to a failure.

16. The device of claim 14 wherein the atomic multiword update comprises a persistent multi-word compare-and-swap (PMwCAS) operation and wherein the operations further comprise recovering the data structure following a failure by rolling back or forward PMwCAS operations that were in-flight during the failure.

17. The device of claim 14 wherein the descriptor table metadata includes an update operation status, multiple target word addresses, expected old values, and new values.

* * * * *